US012746869B1

(12) United States Patent
Bonerb

(10) Patent No.: US 12,746,869 B1
(45) Date of Patent: Sep. 29, 2026

(54) CONVERTIBLE TRAILER SYSTEM FOR HAULING GENERAL CARGO OR LIQUID IN BULK

(71) Applicant: Tim Bonerb, Rye Beach, NH (US)

(72) Inventor: Tim Bonerb, Rye Beach, NH (US)

( * ) Notice: Subject to any disclaimer, the term of this patent is extended or adjusted under 35 U.S.C. 154(b) by 0 days.

(21) Appl. No.: 19/343,220

(22) Filed: Sep. 29, 2025

Related U.S. Application Data

(63) Continuation of application No. 19/245,990, filed on Jun. 23, 2025.

(60) Provisional application No. 63/816,220, filed on Jun. 2, 2025.

(51) Int. Cl.
*B60P 3/00* (2006.01)
*B60P 3/42* (2006.01)
*B65D 88/16* (2006.01)
*B65D 88/22* (2006.01)

(52) U.S. Cl.
CPC .......... *B60P 3/426* (2013.01); *B65D 88/1656* (2013.01); *B65D 88/1693* (2013.01); *B65D 88/22* (2013.01)

(58) Field of Classification Search
CPC .. B60P 3/426; B60P 7/13; B60P 3/245; B65D 88/1656; B65D 88/1693; B65D 88/22
USPC ............. 410/2, 54, 55, 68; 105/359; 220/1.6
See application file for complete search history.

(56) References Cited

U.S. PATENT DOCUMENTS

| | | | | |
|---|---|---|---|---|
| 3,416,762 A * | 12/1968 | Headrick | ................ | B64D 9/00 410/97 |
| 6,186,713 B1 * | 2/2001 | Bonerb | .................. | B60P 3/426 410/68 |
| 6,609,863 B1 * | 8/2003 | Morioka | ................ | B60P 3/426 410/68 |

* cited by examiner

*Primary Examiner* — Stephen T Gordon

(57) ABSTRACT

A freight vehicle has a cargo space that is convertible for handling piece goods and is also suitable for hauling liquid bulk material. A conventional cargo space is equipped with a drop-down frame and flexible liquid enclosure that is stowed in the ceiling of the trailer while hauling a full load of palletized or piece goods materials that can be lowered to the floor for transporting liquid bulk loads. Generally, the long tubular (round and or oval in shape from an end view) can be fitted with a polyethylene film disposable liner. The disposable poly liner will ensure the liquid freight is free from contamination. This concept not only eliminates the need for a liquid tanker to be washed out between each load but also allows for the hauling of piece goods freight when the frame system is raised back to the ceiling.

24 Claims, 27 Drawing Sheets

CONVERTIBLE TRAILER SYSTEM FOR HAULING GENERAL CARGO OR LIQUID IN BULK

CROSS-REFERENCE TO RELATED APPLICATIONS

This application claims the benefit of provisional application Ser. No. 63/816,220 filed Jun. 2, 2025, and utility application Ser. No. 19/245,990 filed Jun. 23, 2025, which are hereby incorporated herein in their entirety.

BACKGROUND OF THE INVENTION

1). Field of Invention

This concept relates to improvements in freight vehicles that have a cargo space convertible for handling piece goods or bulk liquid materials.

2). Prior Art

The desirability of having a cargo space in a freight vehicle that is suitable for handling either piece goods or bulk is well known. The obvious advantage is that the same cargo space on the same vehicle could handle two significantly different types of loads. Convertibility of cargo space provides extreme flexibility and prevents empty runs of the vehicle. For example, a tractor-trailer could handle piece goods such as palletized jars of mayonnaise on one run, and a return run could handle bulk raw materials such as vegetable oil in bulk going back to the packaging factory; a plastics company could send finished goods in standard cargo space and return with a bulk load of liquid resin; a cheese maker could send cases of cheese and bring back milk in the same vehicle, and there are many other uses of a similar nature. In addition to hauling piece goods and liquid bulk in the same freight vehicle, the freight vehicle, such as a 48' dry van trailer, could also be used to haul different types of liquids on one run and a different run, transport another kind of liquid because of the use of a low cost, easy to use disposable poly liner. For example, a freight vehicle could haul bulk spring water on one run and install a new disposable liner to haul milk on another run. In addition to this advantage, the use of a low-cost, single-use disposable FDA-approved liner also eliminates a truck wash requirement for transporting liquids in a specialized liquid bulk tanker trailer, which can be a fraction of the $500 truck wash cost per load.

Another significant expense is the amount of liquid that is undeliverable and considered waste because it remains on the interior surfaces of the tank. This undeliverable waste material is referred to as the "heel," which for milk amounts to about 300 gallons of product.

Tank cleaning companies continue to struggle with the persistent problem of the heel, which can quickly turn into a "plaque" that is more difficult to remove. The average heel in a bulk tanker for milk is about 300 gallons. (300 gallons of milk @ $4.00/gallon=$1,200. The savings from recovering the heel and eliminating tank wash is approximately $1,700.

The term "freight vehicle" encompasses any vehicle that can contain freight or cargo, including, without limitation, trucks, tractor-trailers, railway cars, and movable containers such as those transported by ship, aircraft, truck, and rail, as well as intermodal vehicles. "Piece goods" includes any individual item, such as packaged or palletized goods commonly handled as individual pieces. "Bulk goods" consists of any of the known and widely shipped bulk liquid and paste-like materials. While various convertible freight vehicles are already known for handling dry bulk and powdered materials, there has yet to be a concept for hauling liquids in bulk that has achieved any commercial success—for example, a bulk liquid transport system, U.S. Pat. No. 6,186,713, sold by Bulk Systems International, LLC of Blasdell, NY, consists of manually erecting one or more liquid cargo bags inside a van trailer for transporting liquid. The patent does not specify precisely how and where the liquid cargo bags would be stored in the trailer, nor how they could be washed out and sanitized for reuse. Another liquid bulk transport system, U.S. Pat. No. 11,643,003, sold by Bulk Cargo Systems LLC of Honolulu, HI, severely lacks the proper design elements, such as simplicity, low cost, safety, and ease of use for a single operator in commercial applications. First and foremost, the containers are mounted on the lower sides of the trailer's interior walls. For anyone familiar with the processing industry, perhaps the most hazardous area within a processing facility is inside a van trailer while it's being loaded with approximately 24 pallets of piece goods. Under normal operating and loading conditions, a fork truck driver is operating a 6,000-pound fork truck loaded with a 2,000-pound pallet of goods racing from one end to the other during the loading and unloading process. Not only do the sidewall-mounted containers severely reduce the floor space, but they also make it virtually impossible to load the trailer in an efficient and timely manner. In the real world, it would only be a matter of time before the containers would be damaged and ripped off the trailer walls.

SUMMARY OF THE INVENTION

This concept enables improvements in the handling, filling, transportation, and unloading of bulk liquids in a highway van trailer. As with any product manufactured, packaged, shipped, bought, and sold in commerce, the packaging of the product is crucially important because it must keep the product contamination-free and in a stable, usable, and damage-free condition. For example, grocery sugars such as powdered and brown sugars are generally packaged using a form, fill and seal machine that begins with a roll of polyethylene film being formed into a pouch-like structure, then filled with the proper weight/amount of sugar with the top of the pouch closed via heat seal to create a contaminant-free container. Other grocery products, such as breakfast cereals, use a form, fill, and seal packaging machine before the pouch of cereal is deposited in a cardboard box for mainly handling and display purposes on a grocery store shelf. It is hard to imagine any grocery product without some type of plastic film, plastic or glass container around it, such as bread, yogurt, meat, fish, nuts, vegetables, pickles, etc. . . . Even a 50-pound bag of concrete mix is packaged in a paper bag with a poly-laminate film, which serves as a moisture-proof barrier to keep the cement dry and in usable condition. For the two styles of poly liners used with this concept, each uses a long poly film tube with an average thickness of between 4 and 10 Mils or more. The poly liner is equipped with two end panels that are heat-sealed (one end panel has two spouts) and a sleeve/tube structure. The second style is more straightforward: a long sleeve with no end panels. Because most bulk loads of liquid have a value in the tens of thousands of dollars or more, the liner must be robust, with as few seams (heat seals) as possible, and able to stretch without rupturing or tearing. It should also be made without any weak areas where one or more concentrated loading points could result in liquid leaking. For these two styles of liners, a low-density, food-grade polyethylene resin is used and may be made via a manufacturing process called "blown film extrusion. The "blown film extrusion" process produces a sleeve/tube-like structure having an equal hoop strength all along its length. Both styles of poly film liners have a diameter of approximately 4' with a length of 46', which equates to a length ratio of about 1 to 11.

DETAILED DESCRIPTION OF THE DRAWINGS

Figure 1:
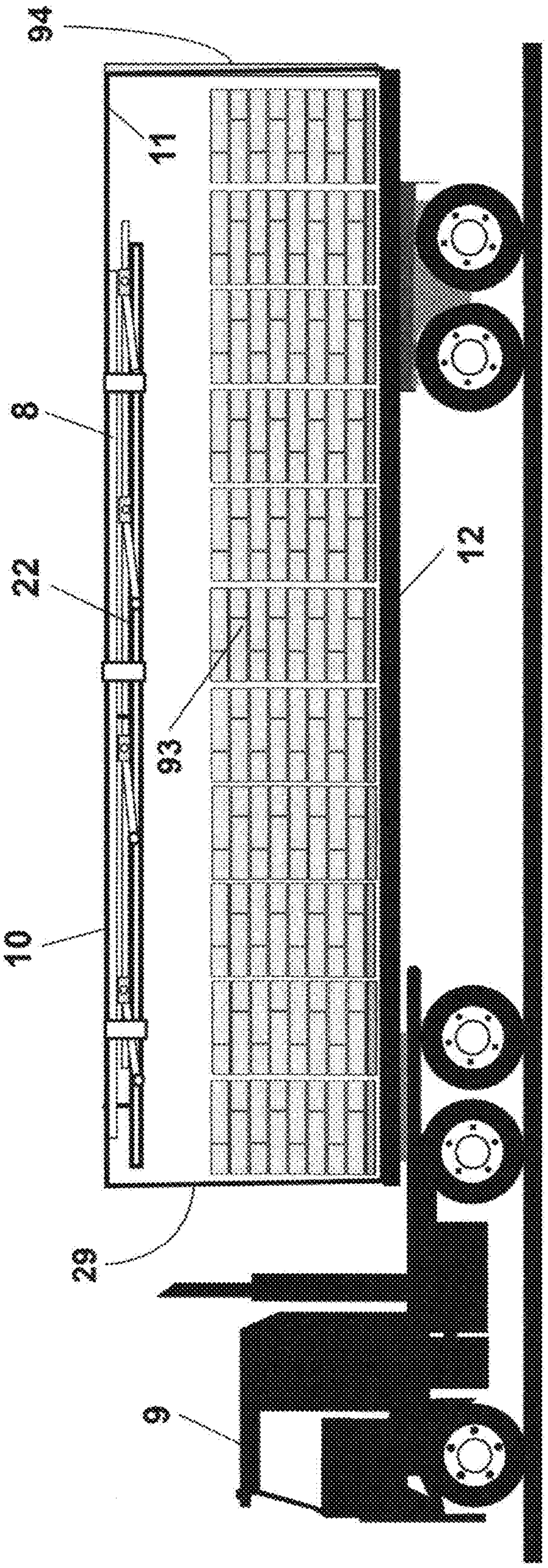
FIG. 1 is a side view of a conventional tractor and van trailer filled with approximately 22 pallets of general cargo, with the liquid bulk system stowed under the trailer's ceiling.

FIG. 1 is a side view of tractor 9 connected to van trailer 10, which is equipped with liquid bulk system 22 for transporting bulk liquids, such as milk, water, juice, corn syrup, and liquid sugar. As shown, van trailer 10 is also equipped with lift frame assembly 8 installed under van roof 11, which provides the hydraulic, mechanical, and cable components for raising and lowering of liquid bulk system 22 between van floor 12 and van roof 11. Liquid bulk system 22 only takes up about 8" of ceiling space and only weighs about 600 pounds when stowed in the ceiling of trailer 10, so van trailer 10 is capable of hauling a full legal load of approximately 44,000 pounds of palletized cargo 93.

Figure 2:
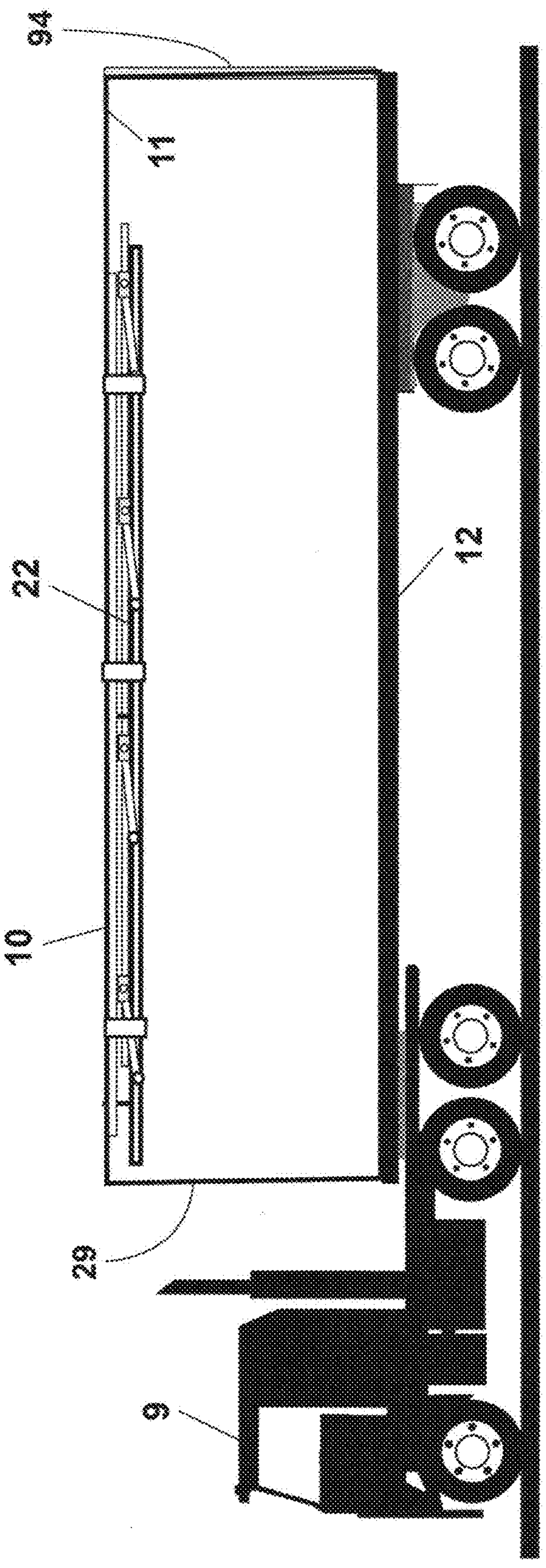
FIG. 2 is a side view of the tractor and van trailer, which has been emptied of its cargo of 22 pallets of general cargo.
Figure 3:
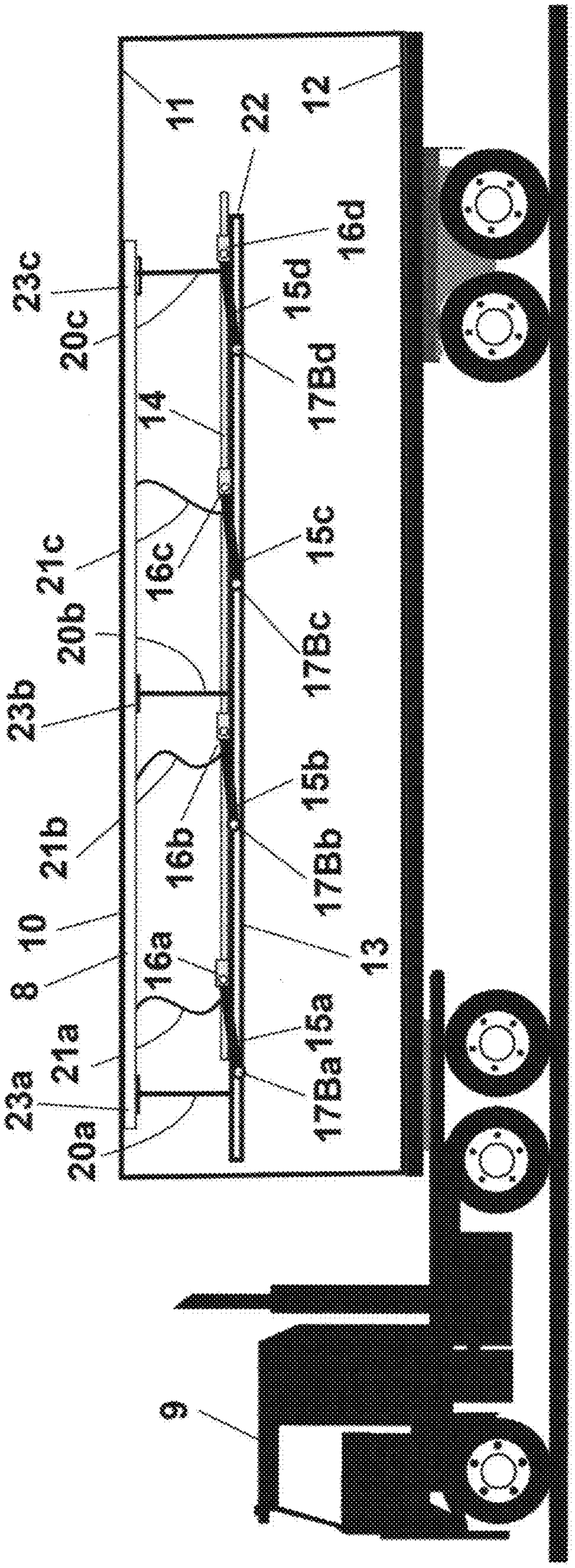
FIG. 3 is a side view of the tractor and van trailer, parked, with the liquid bulk system partially lowered from its stowed position under the trailer's roof.
Figure 4:
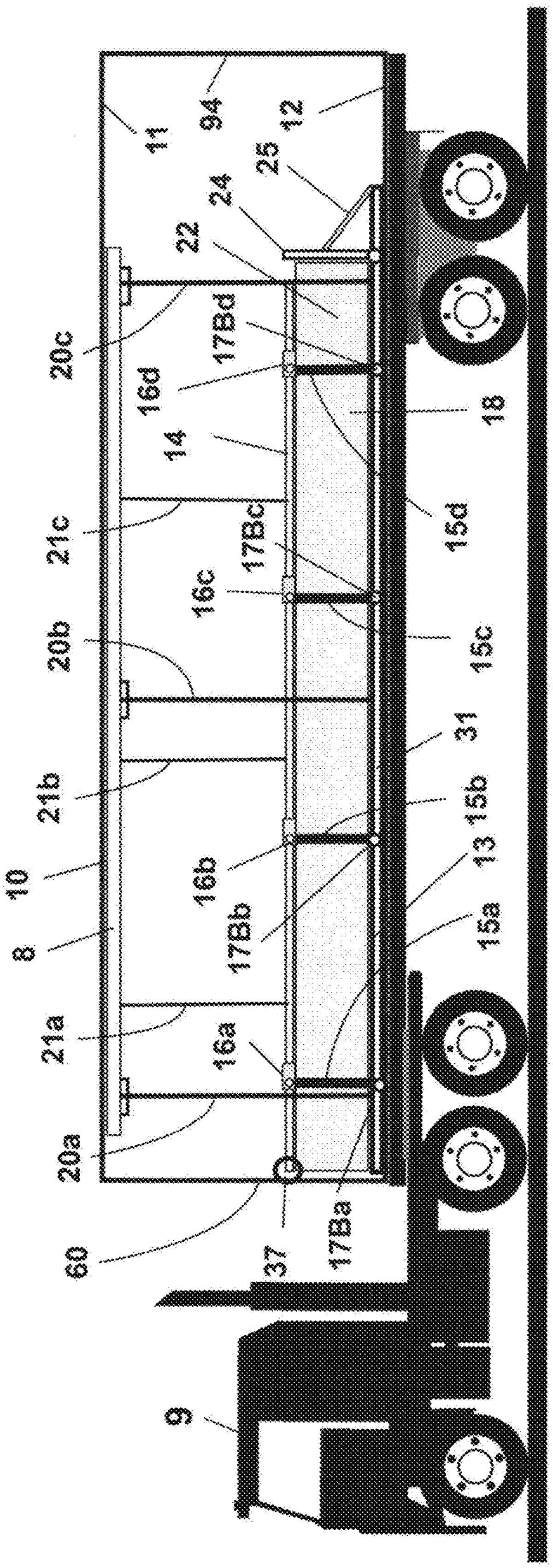
FIG. 4 is a side view of the tractor and van trailer, parked, with the liquid bulk system lowered to the floor of the trailer.

FIGS. 2, 3, and 4 are sequential side views of trailer 10 being prepared to haul a complete, legal load of bulk liquid after the palletized cargo 93 has been unloaded through rear door 94 of trailer 10, as shown in FIG. 2. In FIG. 3, liquid bulk system 22 is shown being lowered from the ceiling of trailer 11 via lift cables 20*a*, 20*b*, and 20*c*. Also shown are position cables 21*a*, 21*b*, and 21*c*, which extend from lift frame assembly 8 to top rail 14 of liquid bulk system 22. Position cables 21*a*, 21*b*, and 21*c* so that they have slack, ensuring no upward tension is applied to top rail 14 at this stage. In FIG. 4, as liquid bulk system 22 lands on the van floor 12 of trailer 10, position cables 21*a*, 21*b*, and 21*c* become taught as they limit the downward travel of rail 14, so that container housing 18 expands from a closed position to an open position necessary for accepting liquid during the filling process. Notice that top rail(s) 14 are held locked in position in trailer 10 via top rail lock 37 against trailer bulkhead 60 and end plate brace 25. Container housing may be made of PVC-coated fabric with a polyester woven scrim, having a material weight of between 28 and 40 oz.

Figure 5:
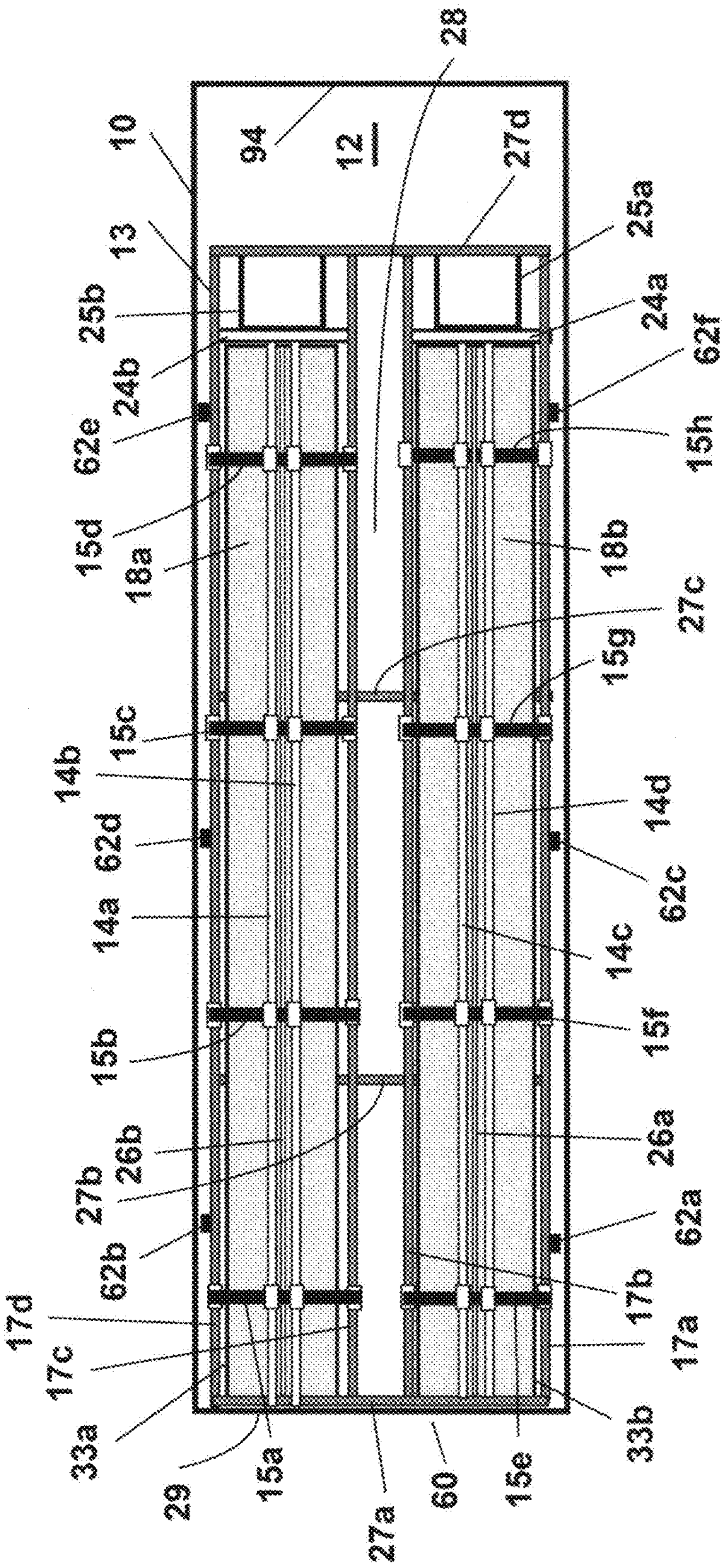
FIG. 5 is a top view of a van trailer with the liquid bulk system, consisting of two container housings, each capable of transporting approximately 22,000 pounds of liquid, secured to a base frame that features a walkway in the middle when resting on the trailer floor.

FIG. 5 is a top view of trailer 10, equipped with liquid bulk system 22, resting on trailer floor 12, which comprises container housings 18*a* and 18*b* secured to base frame assembly 13. The base frame assembly 13 includes base rails 17*a*, 17*b*, 17*c*, and 17*d*, as well as connector rails 27*a*, 27*b*, 27*c*, and 27*d*. Also shown are lift brackets 62*a*, 62*b*, 62*c*, 62*d*, 62*e*, and 62*f*, which are secured to the base frame assembly 13 for attachment to the lift cable(s) 20. It is also important to note that the operator of trailer 10 has complete access inside trailer 10, from the trailer bulkhead 60 to the rear opening 94, via walkway 28.

Figure 6:
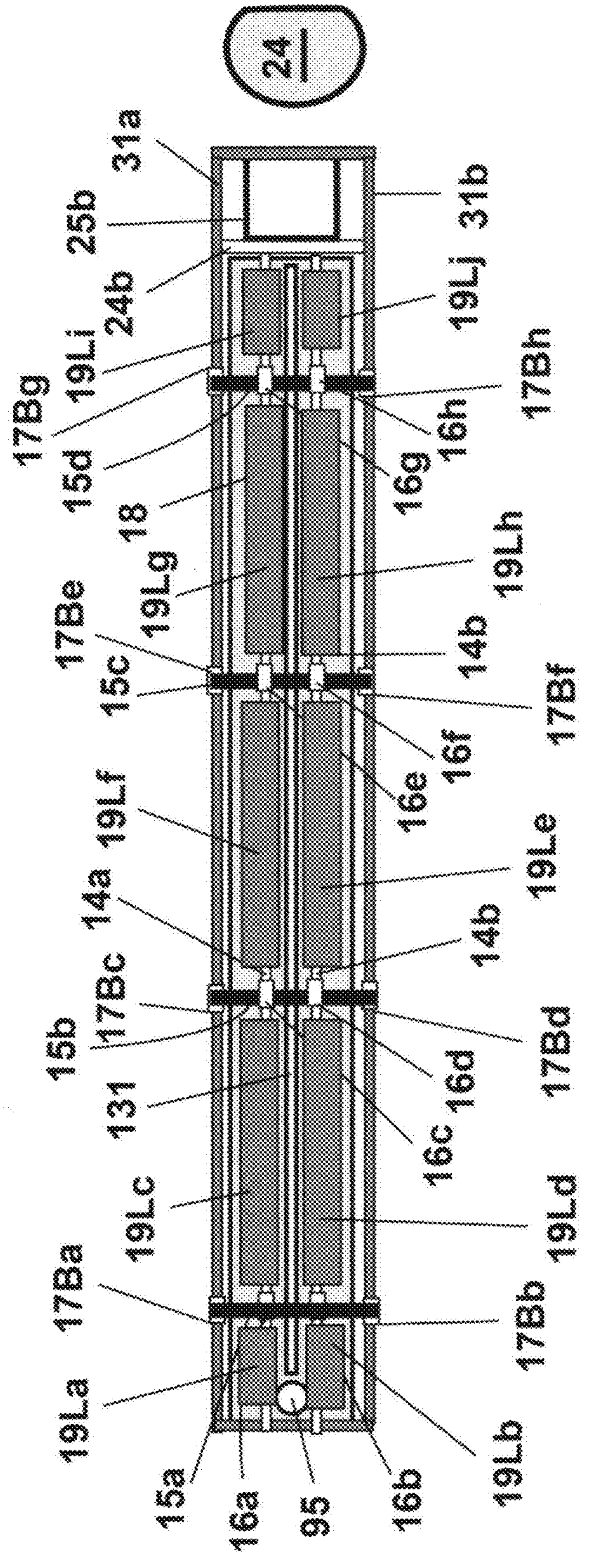
FIG. 6 is a top view of the container housing secured to the modular frame assembly, showing the container housing loop supports secured to the top rails located on the container housing frames.

FIG. 6 is a top view of container housing 18 secured to base rails 31*a* and 31*b* and top rails 14*a* and 14*b* via container housing frames 15*a*, 15*b*, 15*c*, and 15*d*. Also shown is end plate frame 24X, fixed to the back end of container housing 18, which may be connected to end plate 24, temporarily removed and shown resting on van floor 12. Also shown are container housing frames 15*a*, 15*b*, 15*c* and 15*d* connected to bottom rails 17*a* and 17*b* via base frame brackets 17Ba, 17Bb, 17Bc, 17Bd, 17Be, 17Bf, 17Bg and 17Bh. Also shown are container housing frames 15*a*, 15*b*, 15*c*, and 15*d*, secured to top rails 14*a* and 14*b* via top rail brackets 16*a*, 16*b*, 16*c*, 16*d*, 16*e*, 16*f*, 16*g*, and 16*h*. Also shown is container housing 18 secured to top rails 14*a* and 14*b* via container housing loop supports 19La, 19Lb, 19Lc, 19Ld, 19Le, 19Lf, 19Lg, 19Lh, 19Li, and 19Lj, which provides upward support to the walls of container housing 18 when filled with liquid. Container housing 18 may be made of a 40 oz. PVC-coated polyester woven fabric. Also shown is breather vent 95, which allows air to escape from inside container housing 18 during the filling process. Also shown is top opening 131 that runs the length of container housing 18 to provide access inside container housing 18. Top opening 131 may be opened and closed via hook and loop fastening strips, a zipper or by other fastening means.

Figure 7:
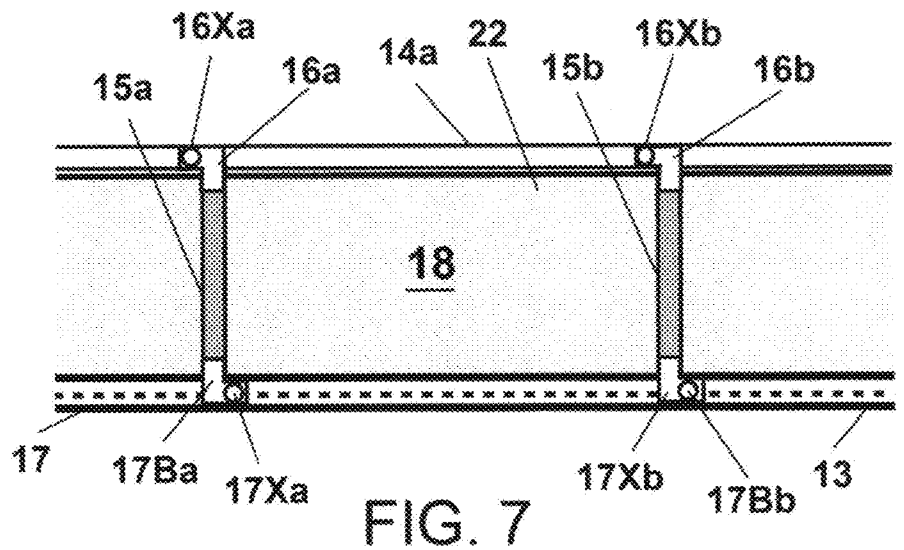
FIG. 7 is a side view of container housing frames in a vertical and locked position, which holds container housing in a fully open position.
Figure 8:
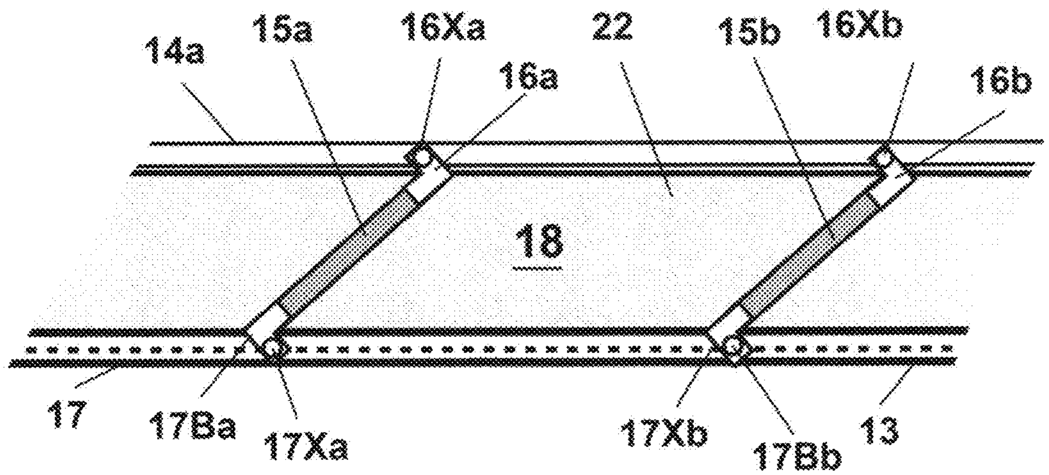
FIG. 8 is a side view of the container housing frames in a partially folded position, as the container housing may be opened and/or closed during the raising and lowering of the bulk liquid system to and from its stowed position under the trailer's ceiling.
Figure 9:
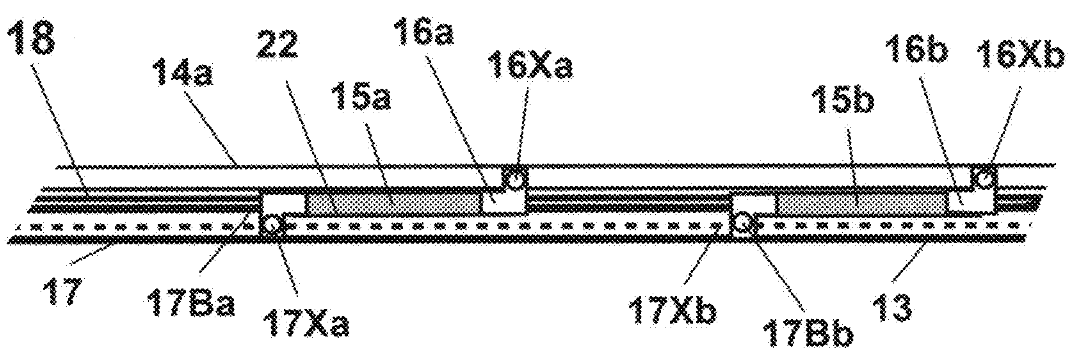
FIG. 9 is a side view of container housing frames in a horizontal position as container housing is closed.

FIGS. 7, 8, and 9 are sequential side views of container housing frame 15 equipped with container housing 18 changing from an open position on trailer floor 12 for transporting liquids to a folded and closed position when liquid bulk system 22 is empty and stowed directly under van roof 11. As shown in FIG. 7, container housing frames 15*a* and 15*b* are shown in a vertical position while the bottom end of container housing frames 15*a* and 15*b* are secured to base rail 17, and the top end of container housing frames 15*a* and 15*b* are secured to top rail 14*a* via top rail brackets 16*a* and 16*b*. In FIG. 8, container housing 18 is in the process of being folded closed as top rail brackets 16*a* and 16*b* and base rail brackets 17Xa and 17Xb rotate via top rail axle bolts 16Xa and 16Xb as well as bottom rail axle bolts 17Xa and 17Xb respectively. In FIG. 9, container housing 18 is fully closed and folded as top rail 14*a* and base rail 17 are only an inch or two apart as container housing frames 15*a* and 15*b* become parallel and horizontal as with base frame rail 17 and top rail 14*a*.

Figure 10:
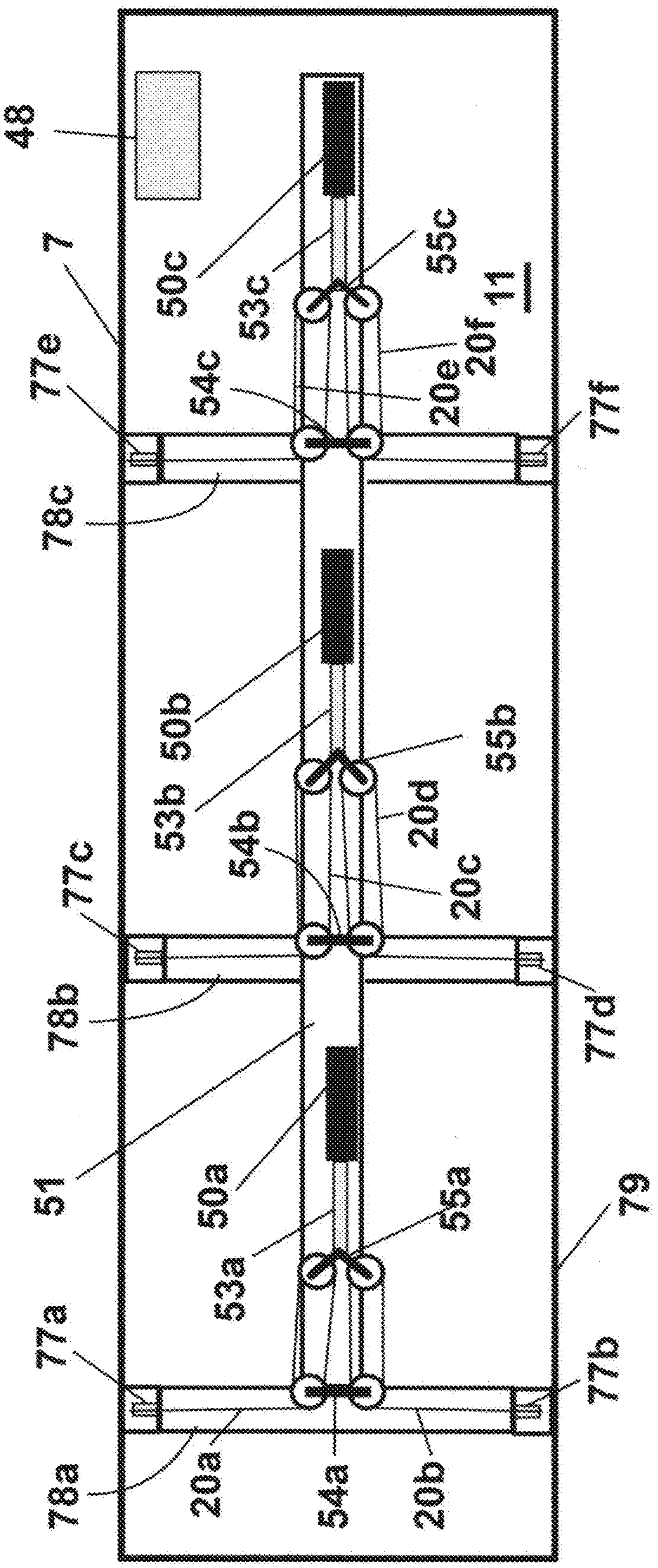
FIG. 10 is a top view of the lift frame assembly installed under the ceiling of a van trailer with each of the three hydraulic cylinders and cable systems for raising and lowering the liquid bulk systems.

FIG. 10 is a top view of the lift frame assembly 8 installed under the van roof 11 of the van trailer 10, which raises and lowers the liquid bulk system 22 as needed. Lift frame assembly 8 is comprised of hydraulic cylinder frame 51 secured to pulley frames 78*a*, 78*b*, and 78*c*. As shown, hydraulic cylinders 50*a*, 50*b*, and 50*c* are fastened to hydraulic cylinder frame 51. Cylinder rods 53*a*, 53*b*, and 53*c* of hydraulic cylinders 50*a*, 50*b*, and 50*c* are equipped with movable double sheave assemblies 55*a*, 55*b*, and 55*c*, respectively. Fixed double sheave pulley assemblies 54*a*, 54*b* and 54*c* are fixed to pulley frames 78*a*, 78*b* and 78*c* respectively. As shown, lift cables 20*a*, 20*b*, and 20*c* are secured to movable double sheave assemblies 55*a*, 55*b*, and to 55*c* and fixed double sheave assemblies 54*a*, 54*b*, and 54*c*, with ends of lift cables 20*a*, 20*b*, and 20*c* passed over and around lift pulleys 77*a* and 77*b*, lift pulleys 77*c* and 77*d*, as well as lift pulleys 77*e* and 77*f* to be attached to base frame assembly 13. Hydraulic cylinders 50*a*, 50*b*, and 50*c*, and hydraulic pump 48 must be designed, sized, and calibrated to lift relatively small loads, which is essentially the weight of the liquid bulk system 22, plus a couple of hundred pounds of liquid to prevent injury to the operator and/or damage to the lift assembly. Under normal operating conditions, the hydraulic cylinder should supply enough force to lift the liquid bulk system 22 when it is nearly empty, with a couple hundred pounds of liquid remaining after emptying. If a more powerful hydraulic system were used, especially when the liquid bulk system 22 was filled with about 44,000 pounds of bulk liquid material such as milk, then it would be quite possible for hydraulic cylinders 50*a*, 50*b*, and 50*c* with hydraulic pump 48 to pull down and rip lift frame assembly

8 from the van roof 11 of van trailer 10. Also, the use of double sheave pulleys in the arrangement as shown allows a 2' long hydraulic cylinder 50*a* to deliver as much as 8' of lift cable 20*a* instead of using an 8' long cylinder with simple directional pulleys.

Figure 11:
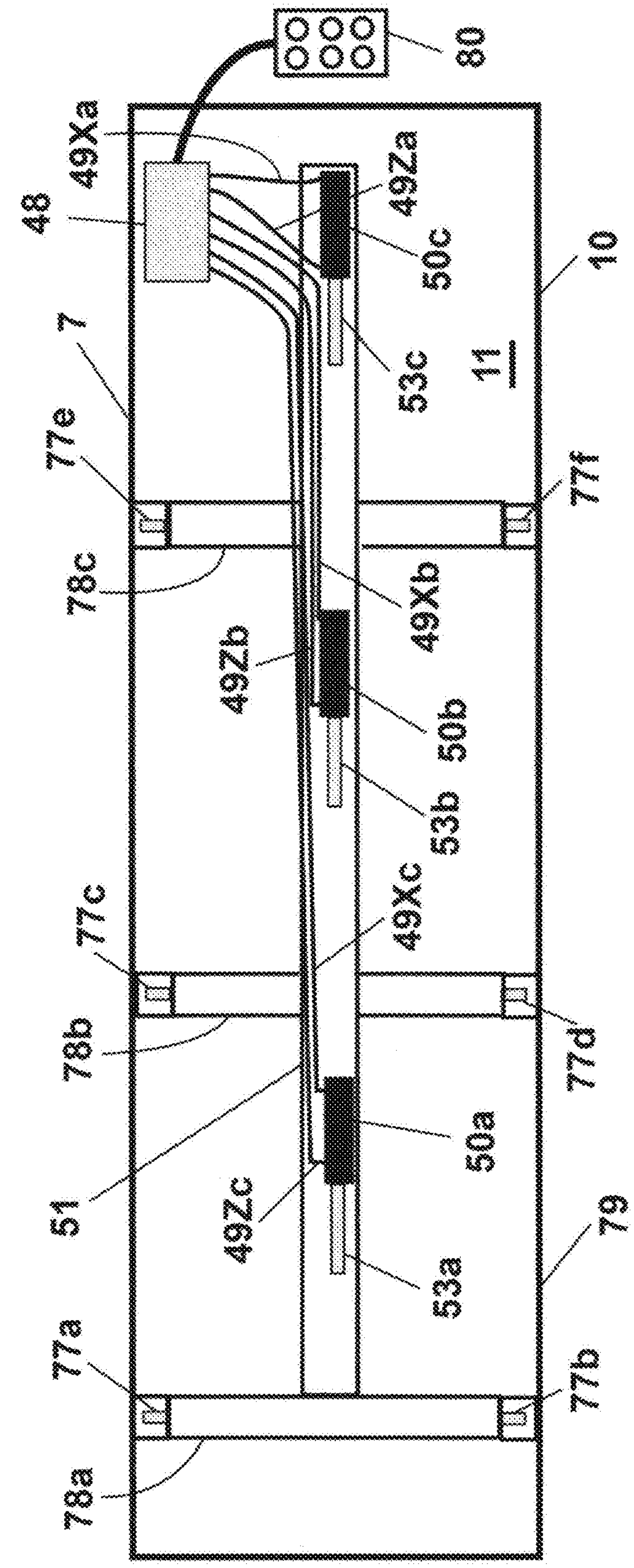
FIG. 11 is a top view of the lift frame assembly, equipped with a hydraulic pump and reservoir, showing the input and output hydraulic hoses connected to the hydraulic cylinders.

FIG. 11 is a top view of van trailer 10, showing hydraulic pump 48, which may be powered by 115V or 12V electrical current, connected to hydraulic cylinders 50*a*, 50*b*, and 50*c* via hydraulic output hoses 49Xa, 49Xb, and 49Xc, as well as hydraulic return hoses 49Za, 49Zb, and 49Zc, respectively. Hydraulic cylinders 50*a*, 50*b*, and 50*c* are operated via a six-button pendant switch 80, which controls hydraulic pump 48.

Figure 12:
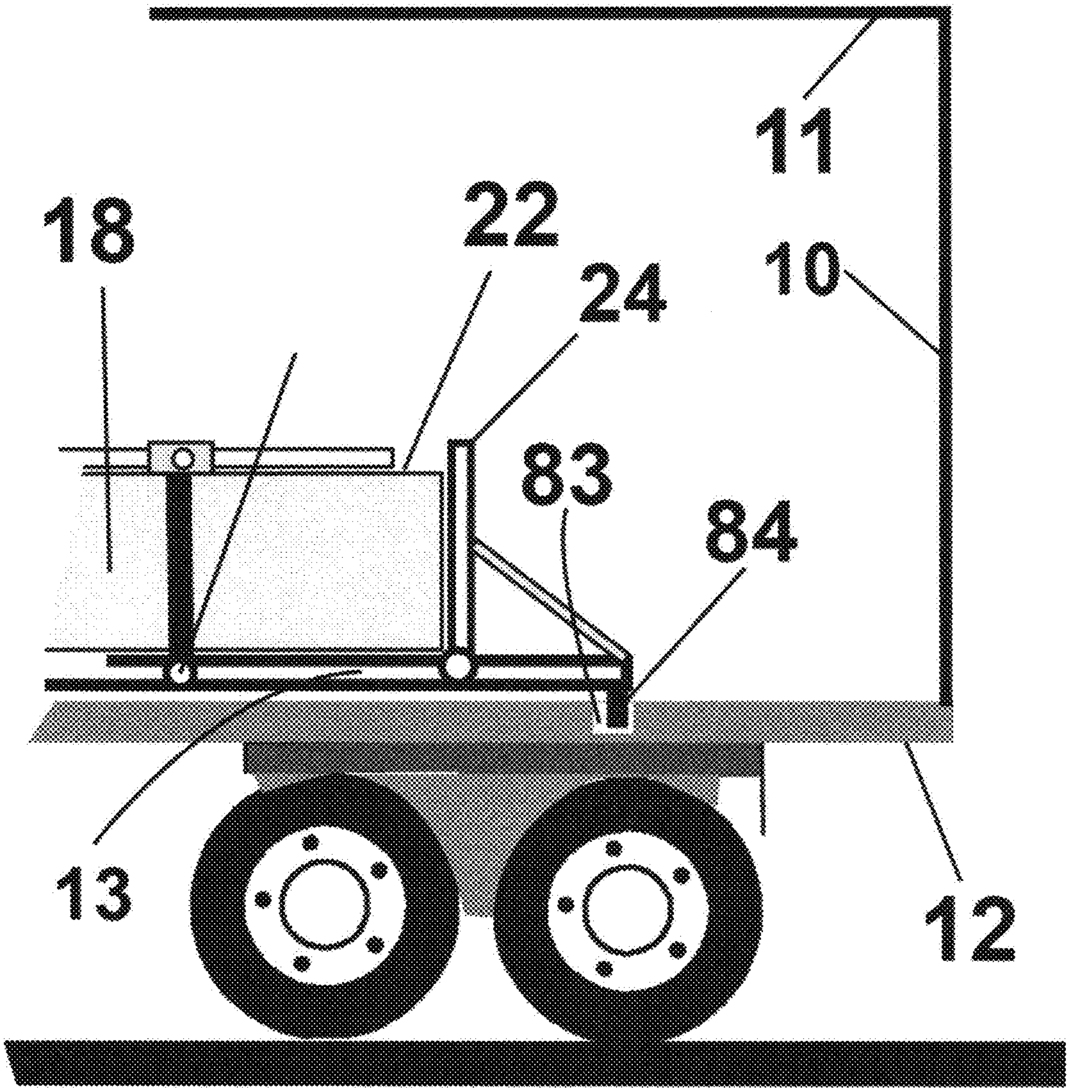
FIG. 12 is a side view of the liquid bulk system resting and locked onto the trailer floor via a floor locking pin.

FIG. 12 is a side view of the back end of van trailer 10 with base frame assembly 13 equipped with one or more floor locking pin(s) 84 that fit inside one or more trailer floor hole(s) 83. As with moving or transporting any liquid in a closed tank environment, stopping and starting will cause splashing, sloshing, and unwanted movement, which makes keeping bulk liquid system 22 secured and in a stable condition to trailer 10 critical.

Figure 13:
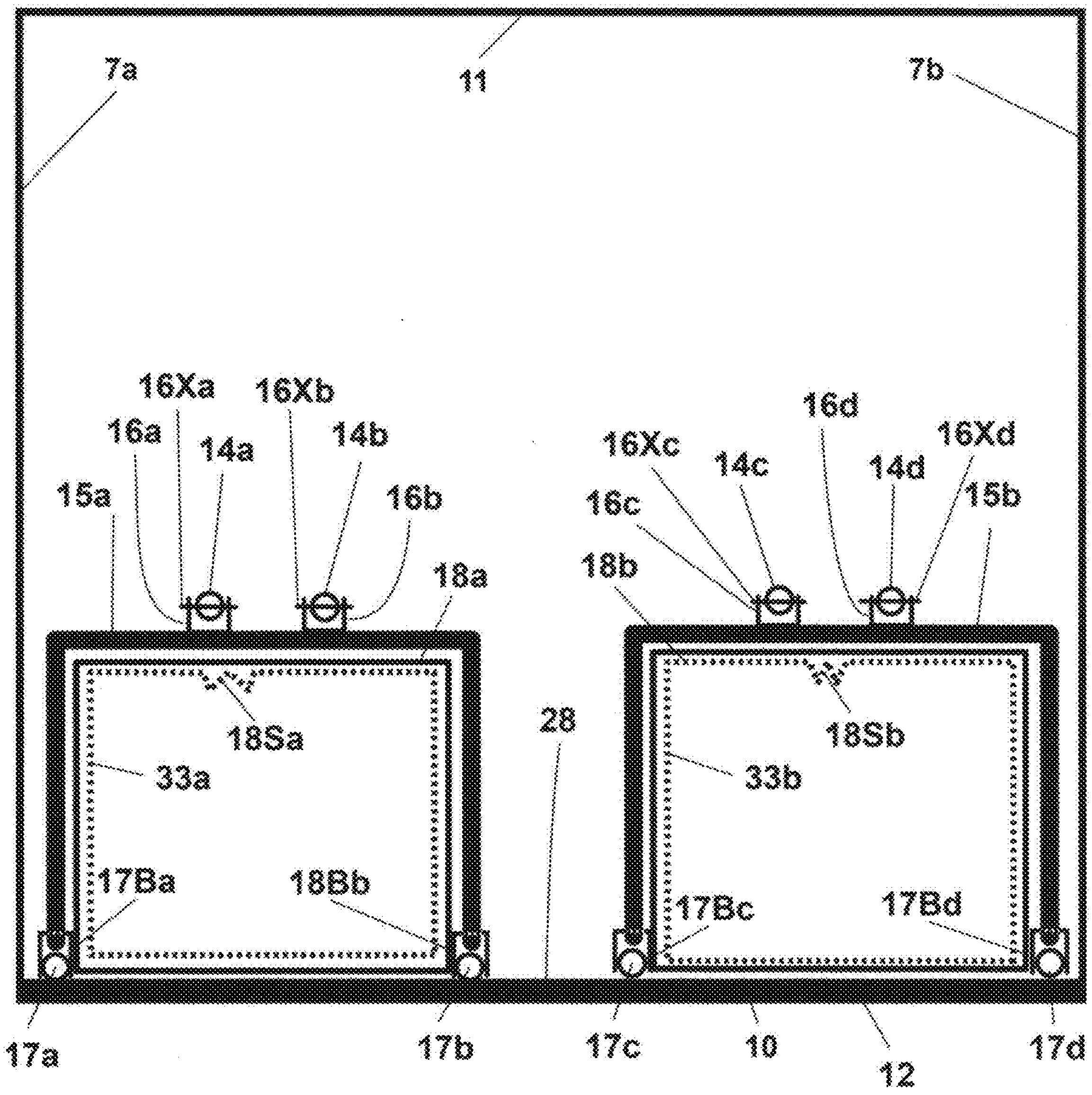
FIG. 13 is an end view of both container housings, equipped with poly liners that have slack material to ensure they are larger in every dimension than the container housings.

FIG. 13 is a layout drawing of an end view of van trailer 10 with container housings 18*a* and 18*b* empty of liquid and taking shape as a rectangular shape. Of course, if container housings 18*a* and 18*b* were filled with liquid, they would have a more rounded or oval shape. As shown, container housings 18*a* and 18*b* are equipped with poly liners 33*a* and 33*b*, respectively. Please take note that poly liners 33*a* and 33*b* are made larger (in every dimension) than container housings 18*a* and 18*b* by the addition of poly liner slack 18Sa and 18Sb. Poly liner 33 should always be made larger than container housing 18 (in every dimension) so that poly liner 33 serves only as a barrier film surface against container housing 18, keeping the liquid being handled free from contamination. Poly liner 33 is used only to provide a clean and contaminant-free barrier surface without any means of supporting the liquid being transported. As shown, container housing frames 15*a* and 15*b* are connected to base rails 17*a*, 17*b*, 17*c*, and 17*d* via base rail brackets 17Ba, 17Bb, 17*bc*, and 7*bd*. Also shown are top rail brackets 16*a*, 16*b*, 16*c*, and 16*d* secured to container housing frames 15*a* and 15*b*, respectively.

Figure 14:
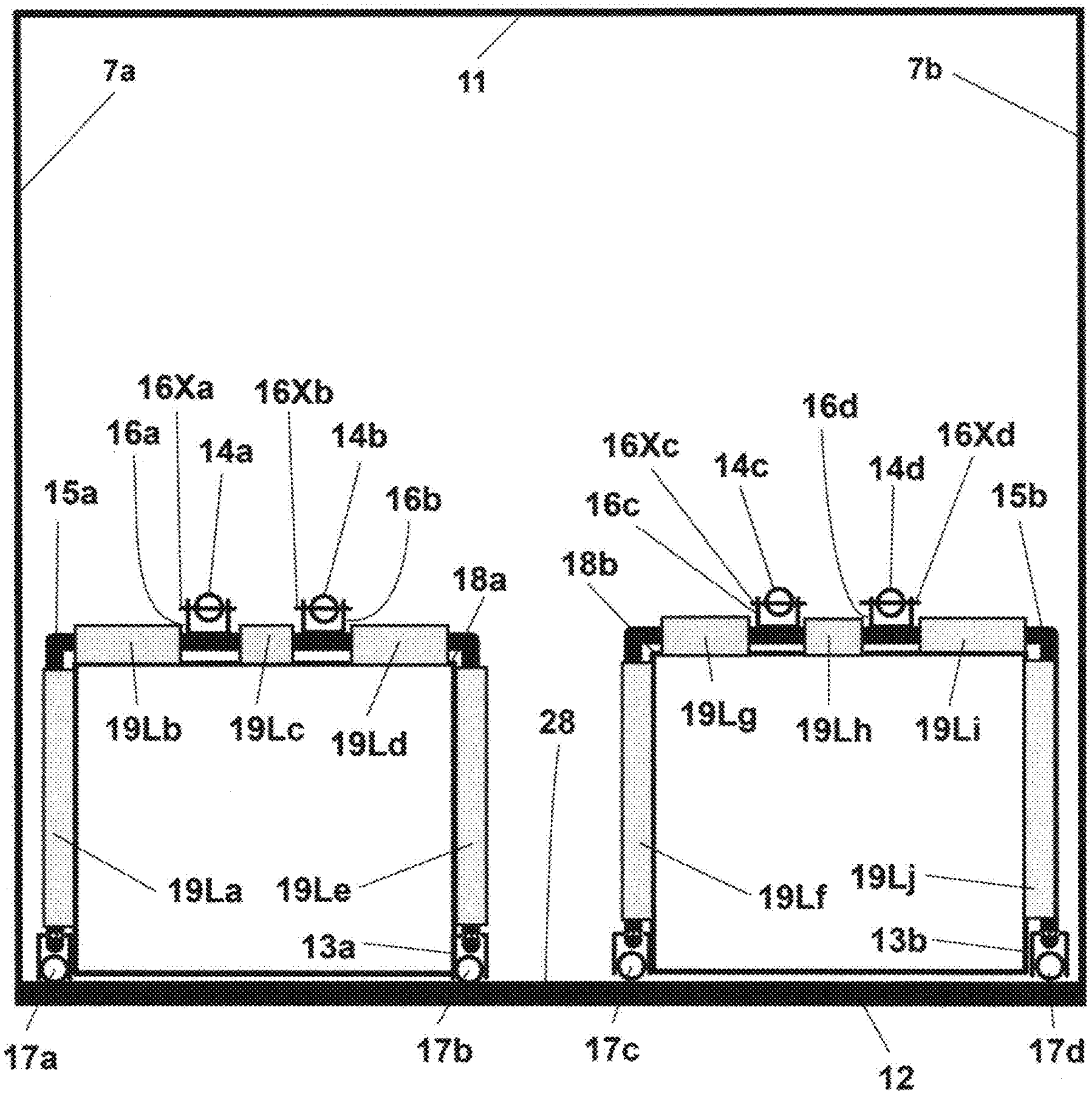
FIG. 14 is an end view of the container housing, secured by container housing loop supports, which secure the container housing frames.

FIG. 14 is an end view of container housing frames 15*a* and 15*b* in trailer 10 equipped with container housings 18*a* and 18*b*. As shown, container housing 18*a* is equipped with container housing loop supports 19La, 19Lb, 19Lc, 19Ld, and 19Le, which are attached to container housing frame 15*a*, as well as container housing 18*b*, which is equipped with container housing loop supports 19Lf, 19Lg, 19Lh, 19Li and 19Lj and attached to container housing frame 15*b*.

Figure 15:
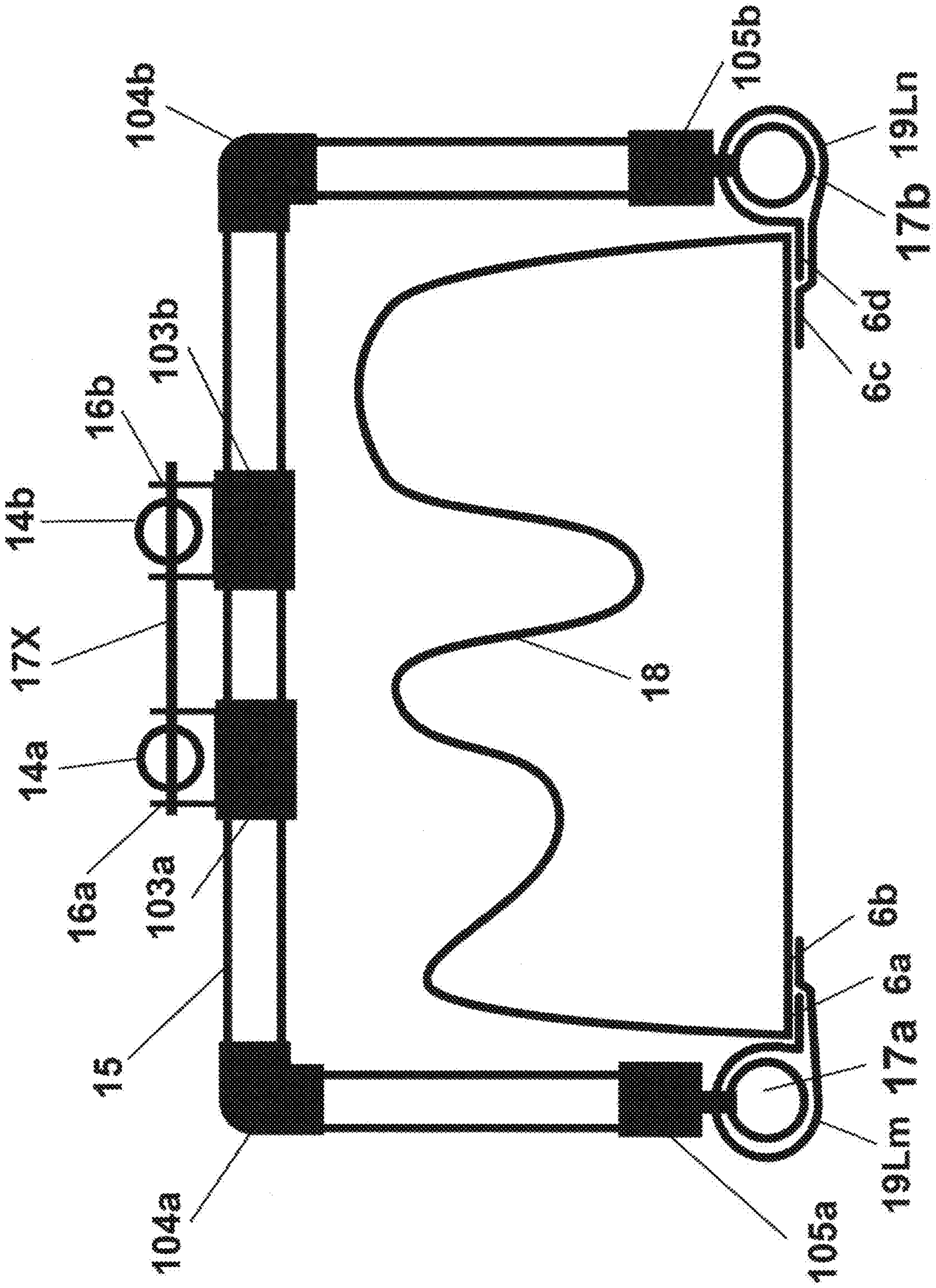
FIG. 15 is an end view of the lengths of tubing that form the container housing frame, which can be easily assembled and/or disassembled as required by adding pipe fittings. Also shown are container housing support loops, heat-sealed to the exterior floor area of the container housing, which are attached to the base rails.

FIG. 15 is an end view of container housing frame 15 constructed in a modular fashion by using sections of straight tubing or pipe connected by various pipe fittings 104, 105, and 106. This type of modular construction allows container housing 18 to be attached to container housing frame 15 sections via its container housing support loop(s) 19L first before adding the pipe fittings such as straight pipe fittings 103*a* and 103*b*, 90-degree elbow pipe fittings 104*a* and 104*b*, and swivel pipe fittings 105*a* and 105*b*. Also shown are container housing support loops 19Lm and 19Ln, which are connected to container housing 18 via heat seals 6*a*, 6*b*, 6*c*, and 6*d*, respectively, and wrap-around base rails 17*a* and 17*b*, respectively. While it may be obvious, bulk liquid system 22 may be assembled by laying out container housing 18*a* stretched out on a floor and then passing the base rails 17*a* and 17*b*, top rails 14*a* and 14*b*, as well as the sections of straight pipe of container housing frame 15 through the various and corresponding container housing support loops. Pipe fittings 103*a*, 103*b*, 104*a*, 104*b*, 105*a* and 105*b* would be added last. The modular frame construction enables quick and easy repair and replacement of the frame components of bulk liquid system 22.

Figure 15A:
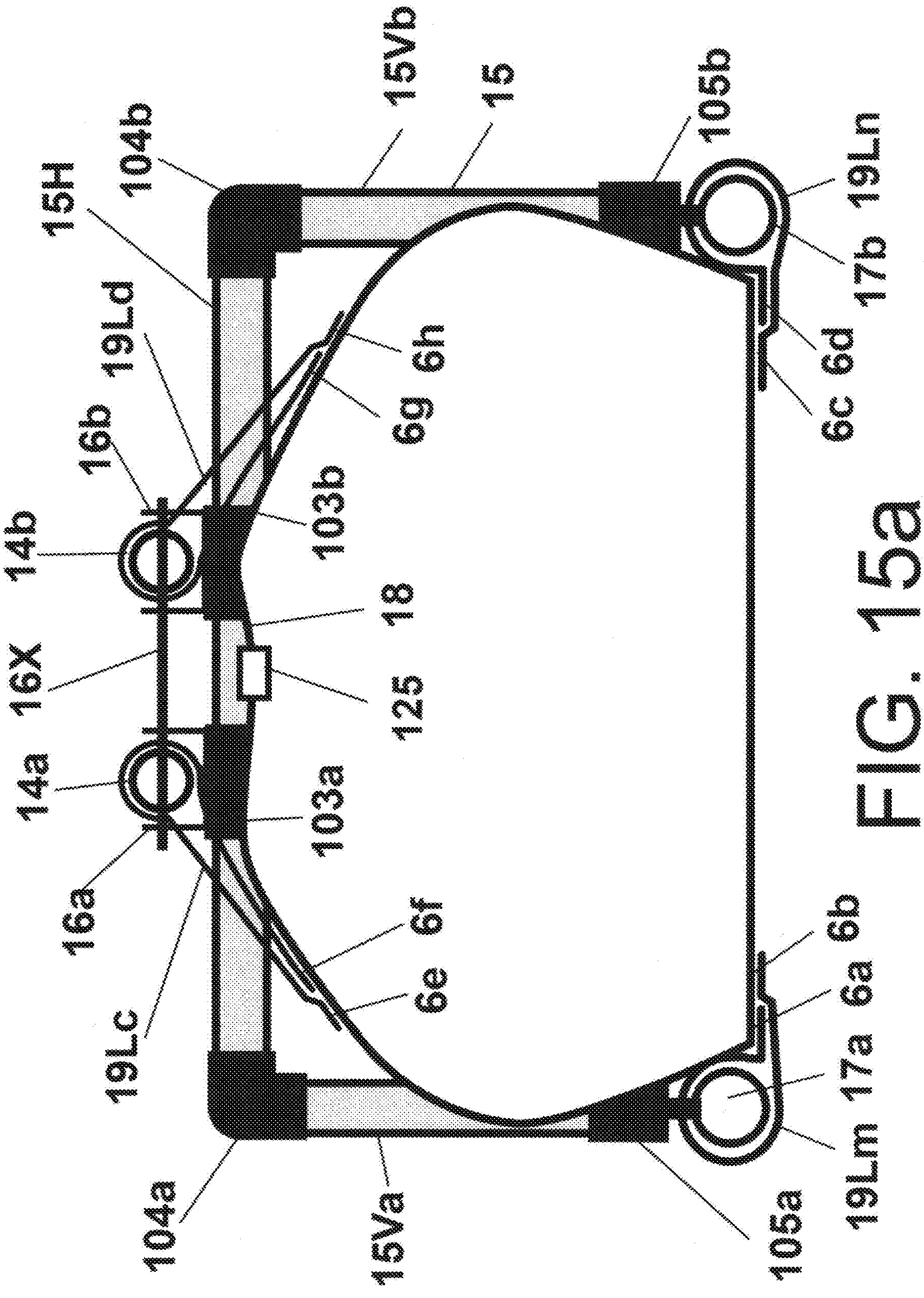
FIG. 15*a* is an end view of container housing secured to the base rails and top rails via container housing loop supports.

FIG. 15*a* is an end view of container housing 18 secured container housing frame 15. As shown, once container housing 18 is filled with liquid, its sides naturally bulge outward. As discussed and taught by engineers familiar with handling and transporting liquids in bulk trailers and railcars, the best overall design utilizes a long tube or oval shape, with one of the main goals being to keep the center of gravity of the load as low as possible. An even better design, as this concept illustrates, is an oval shape cut in half horizontally to create a larger base area supported on the trailer floor, as well as an even lower center of gravity. For example, to transport a full load of approximately 44,000 pounds of water, each container housing 18 requires a capacity of 22,000 pounds within each container having about 350 cubic feet of capacity. The actual outside dimensions would be container housing 18 with a base of 3.75' and a height of about 2.5' with a length of about 40'. (3.75' wide×2.5' high=9.4 cubic feet×40'=376 cubic feet capacity×2=752 cubic feet. The bulk density of water is about 58 pounds×9.4/cubic feet=526 pounds per foot×80 feet=43,616 pounds. Add in the weight of the bulk liquid system 22, which is approximately 300 pounds, making a total of 43,916 pounds, a full legal load. The long and relatively low oval shape with a flat bottom of the two container housing(s) 18 enables a van trailer 10 to handle the load safely and efficiently. Also, notice that loop supports 19Lc and 19Ld are secured to top rails 14*a* and 14*b* in a manner such that top rail brackets 16*a* and 16*b* are adjustable, whereby they can be moved inward or outward on the top section of container housing frame 15H to change the shape and profile of container housing 18 if desired. As shown, top rail axle bolt 16X provides added support to hold top rail brackets 16*a* and 16*b* in a stable and locked position. Notice that the ends of container housing support loops 19Lc and 19Ld are secured to container housing 18 via heat seals 6*e*, 6*f*, 6*g*, and 6*h*, respectively. In essence, the container housing frame 15H provides the necessary height to offer significant support, holding top rails 14*a* and 14*b* in an elevated and stable position. Should a liquid material with a much lower bulk density than water be hauled, vertical frame posts 15Va and 15Vb can be replaced with taller lengths of pipe to accommodate a higher and larger capacity container housing 18 and poly liner 33. Also shown is zipper 125 on the top center portion container housing 18 which provides an opening in the top of container housing 18 for cleaning, repair, washing and placement and/or removal of poly liner 33 or poly liner sleeve 33T.

Figure 16:
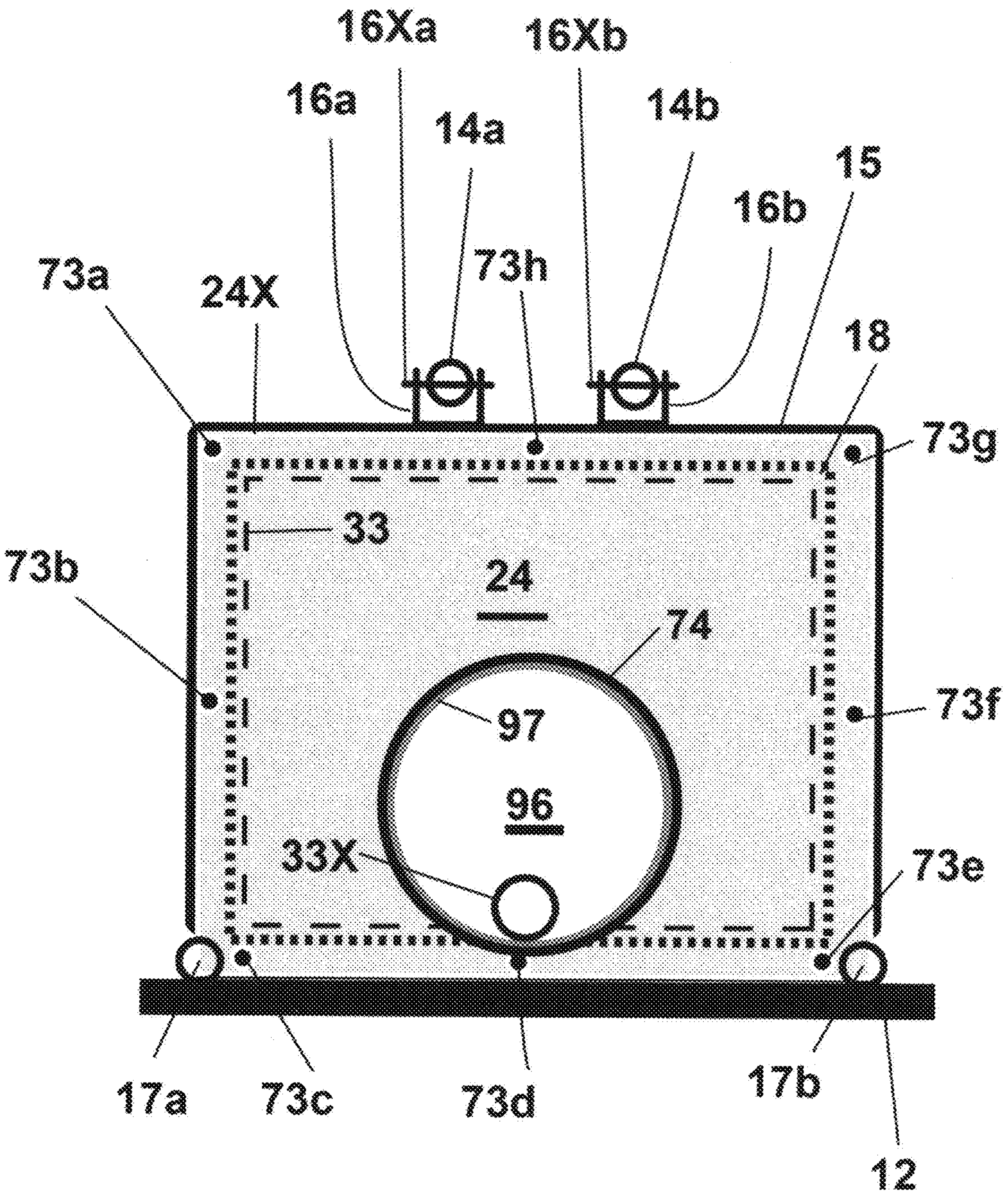
FIG. 16 is an end view of the end plate, equipped with a removable access port cover held in place via a V-band clamp. The access port cover may be fitted with one or more fill, discharge, and/or breather spouts.

FIG. 16 is an end view of the rear container housing frame 15, with the end plate 24 secured to it via hub bolts 73*a*, 73*b*, 73*c*, 73*d*, 73*e*, 73*f*, 73*g*, and 73*h*. End plate 24 is equipped with access port cover 96, which can be made of clear plastic for visually inspecting the loading and unloading process. As part of the access port cover 96, a liner fill-discharge spout tube is installed for the filling and unloading of liquid contained inside poly liner 33. Access port cover 96 may be connected to access port frame 97 via fasteners or a V-Band clamp 74. Access port cover 96 can be removed for inserting and removing poly liner 33 inside container housing 18.

Figure 17:
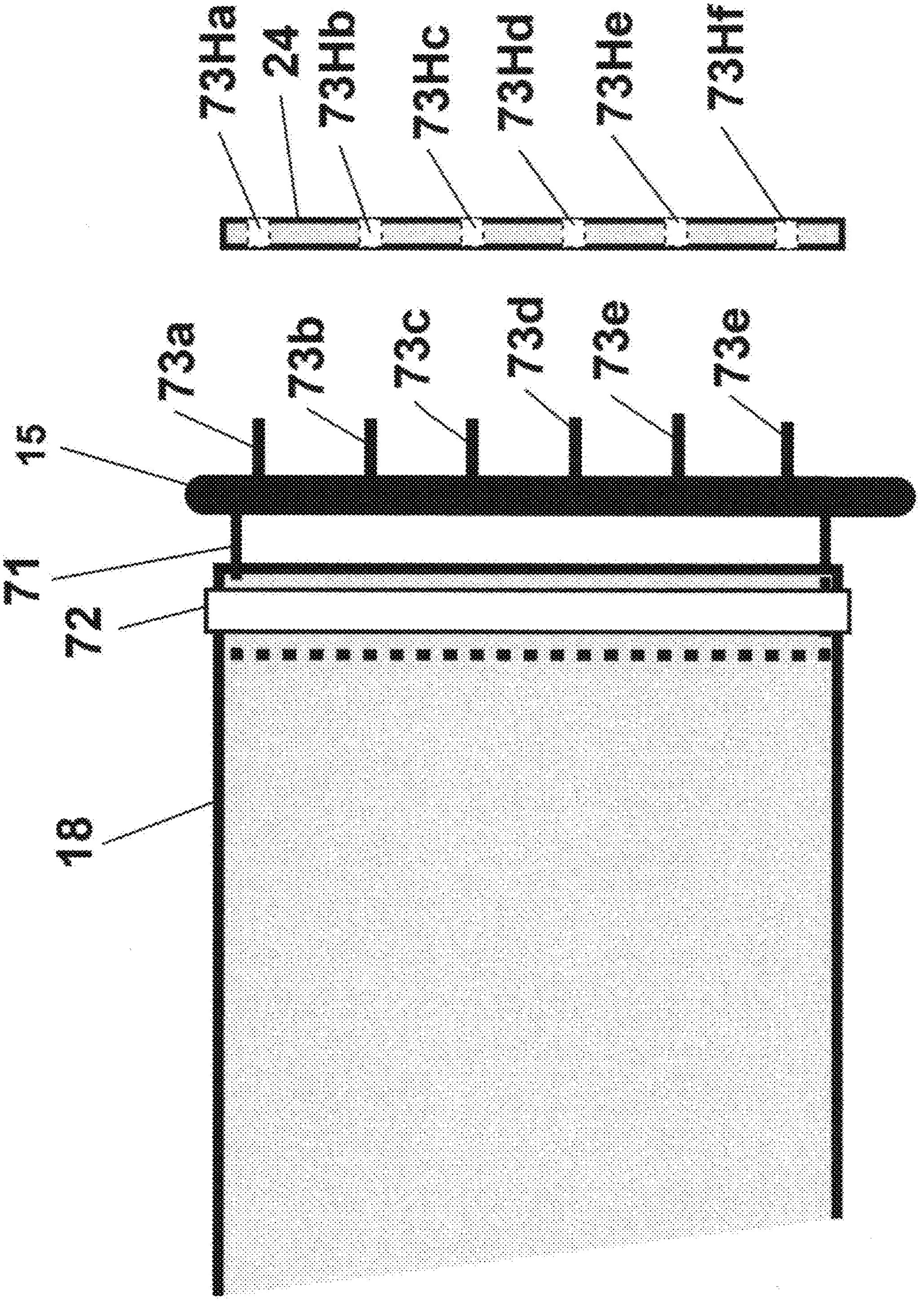
FIG. 17 is a side view of the container housing secured to the container housing hub via the container housing hub clamp.

FIG. 17 is a side view of the fill-discharge end of container housing 18, which is equipped with container housing hub 71 placed inside it, with the container housing hub clamp 72 tightly wrapped around it to form a waterproof seal. Notice that container housing hub 71 interfaces tightly with container housing frame member 15. As shown, hub bolts 73*a*, 73*b*, 73*c*, 73*d*, 73*e*, and 73*f* are aligned with end plate hub holes 73Ha, 73Hb, 73Hc, 73Hd, 73He, and 73Hf so that a watertight seal is achieved. Under standard operating procedures, end plate 23 may be removed for cleaning and maintenance purposes.

Figure 18:
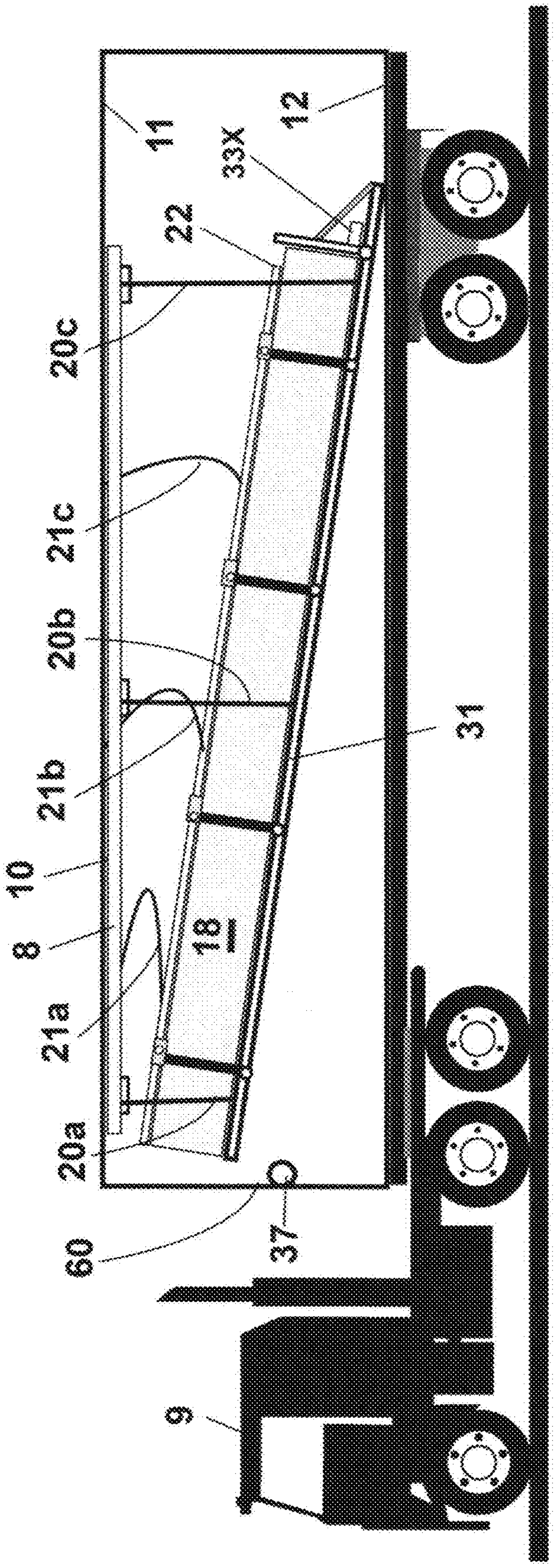
FIG. 18 is a side view of the liquid bulk system inside the trailer, raised and held in a sloped position by operating the three independent cable lift systems, allowing any remaining liquid to drain towards the discharge spout for maximum emptying.

FIG. 18 is a side view of van trailer 10 showing liquid bulk system 22 in a tilted or sloped position to allow the remaining liquid in container housing 18 to drain towards the liner fill-discharge tube 33X towards the end of the liquid unloading process. Before tipping liquid bulk system 22, top rail lock 37 is unlocked. Usually, when liquids like milk are transported in a tanker trailer, about 300 gallons of milk remain on the interior surfaces of the tank and is lost as waste when it is washed off at a tank cleaning facility. The remaining liquid is known as the "heel" and is sometimes addressed as plaque after the milk dries. The tilting function of liquid bulk system 22 is achieved by allowing the three hydraulic cylinders 50*a*, 50*b*, and 50*c*, along with their related lift cable assemblies, to operate independently of one another. By having separate controls for hydraulic cylinders 50*a*, 50*b*, and 50*c*, the operator can choose an infinite number of angles and heights at which the liquid bulk system 22 may function. For example, to insert poly liner 33, the operator may raise the back, open end of container housing 18 to a height of 4' while lowering the front end of liquid bulk system 22 to van floor 12 level, creating a downward slope for insertion of poly liner 33.

Figure 19:
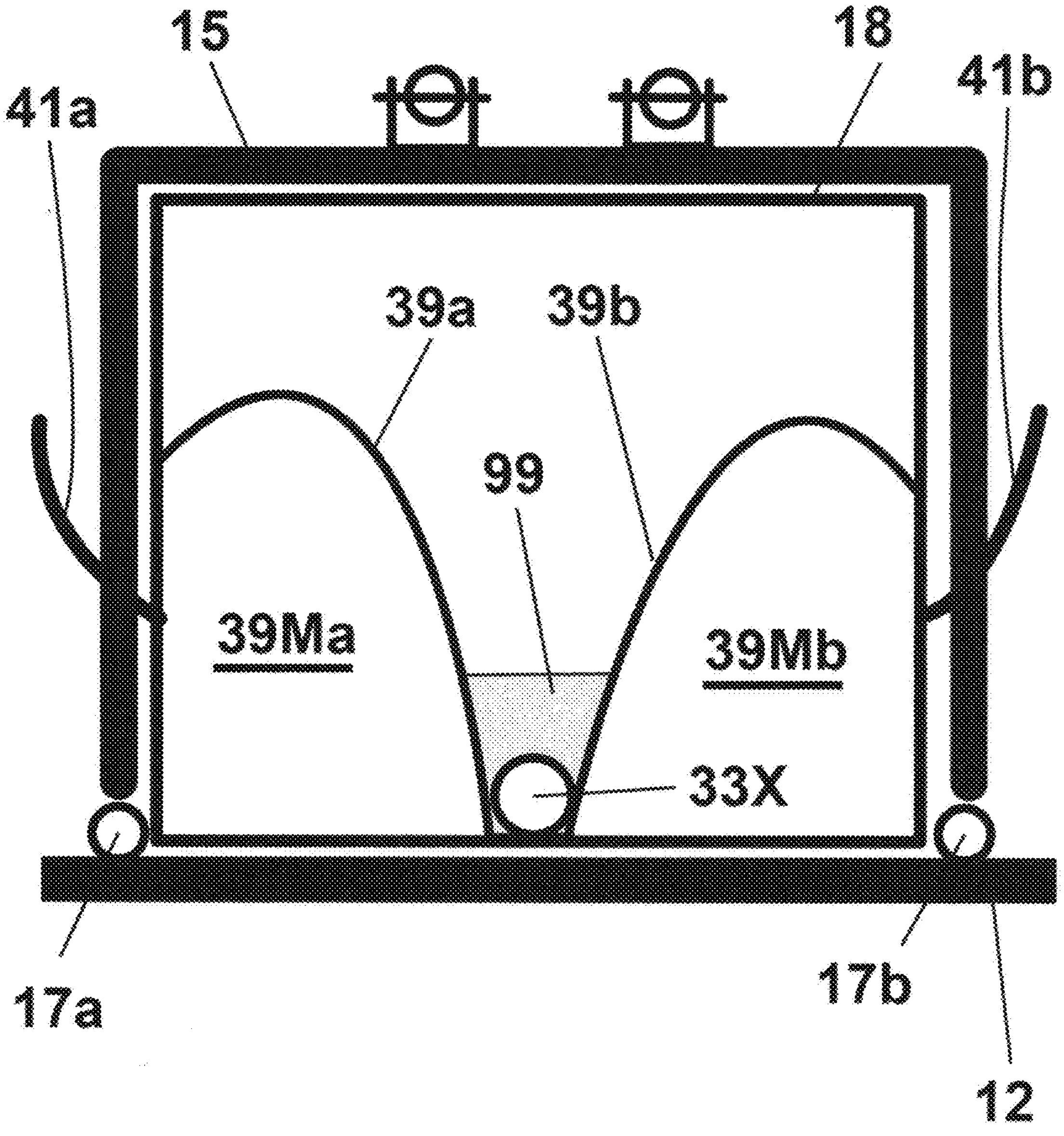
FIG. 19 is an end view of the container housing, equipped with two inflatable liners partially inflated, causing remaining liquids to be directed towards and into the discharge spout.

FIG. 19 is an end view of container housing 18 equipped with inflate liners 39*a* and 39*b* to further drain and collect liquid 99 inside. As shown, when membranes 39Ma and 39 Mb inflate, they expand upward via inflation with low-pressure air through inflating membrane hoses 41*a* and 41*b*, allowing liquid 99 to drain down to liner fill-discharge tube 33X.

Figure 20:
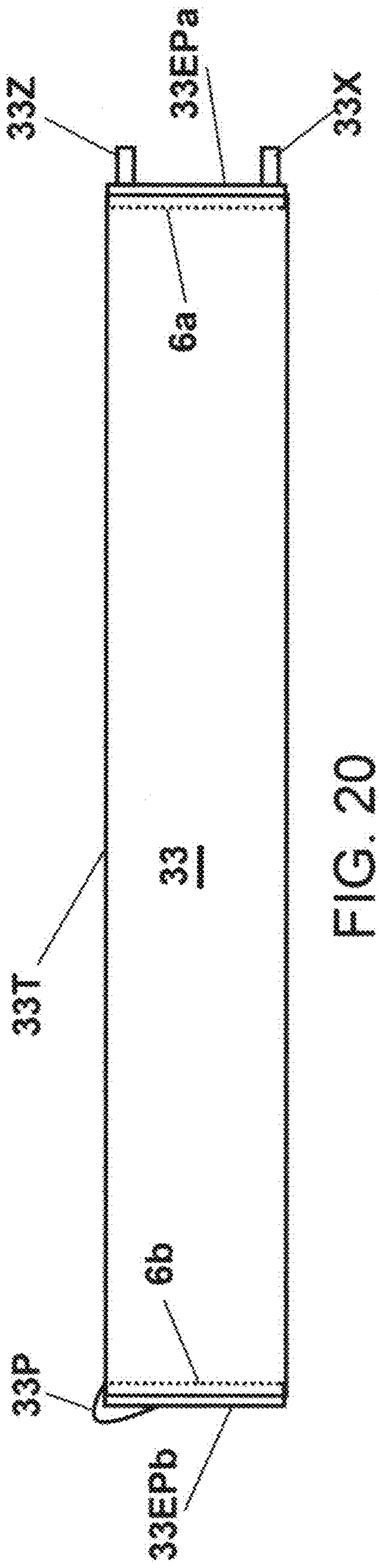
FIG. 20 is a side view of poly liner with end panels heat-sealed to a poly liner sleeve with the left end equipped with a pull tab and the right end equipped with a fill-discharge tube and breather tube.

FIG. 20 is a side view of poly liner 33 which is constructed of a length of poly film sleeve 33T with end panels 33EPb and 33EPB, which are oval shaped, heat-sealed to both ends via heat-seals 6*b* and 6*a* respectively. As shown end panel 33EPb is also equipped with pull tab 33P while end panel 33EPa is equipped with liner fill-discharge tube 33X and liner breather tube 33Z.

Figure 20B:
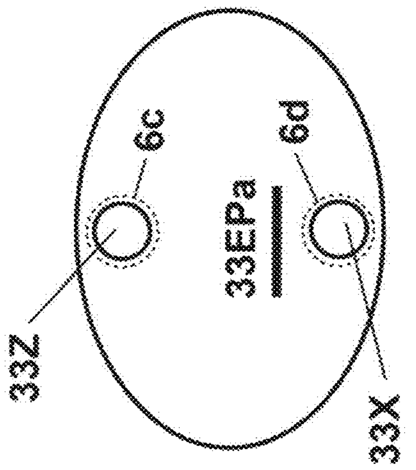
FIG. 20*b* is an end view of an end panel equipped with a breather tube and fill-discharge tube which are attached to the end panel via heat-sealing.
Figure 20A:
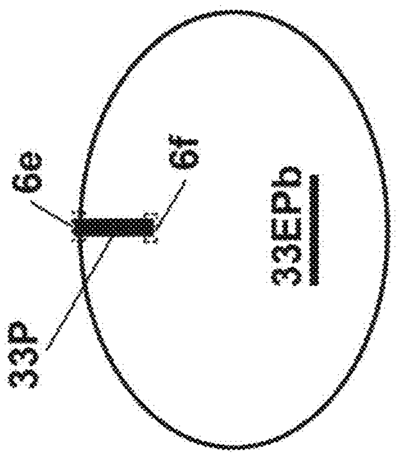
FIG. 20*a* is an end view of an end panel equipped with a pull tab.

FIG. 20*a* is an end view of end panel 33EPb with liner pull tab 33P attached via heat-seals 6*e* and 6*f*.

FIG. 20*b* is an end view end panel 33EPa equipped with liner fill-discharge tube 33X and liner breather tube 33Z secured via heat-seals 6*d* and 6*c* respectively.

Figure 20C:
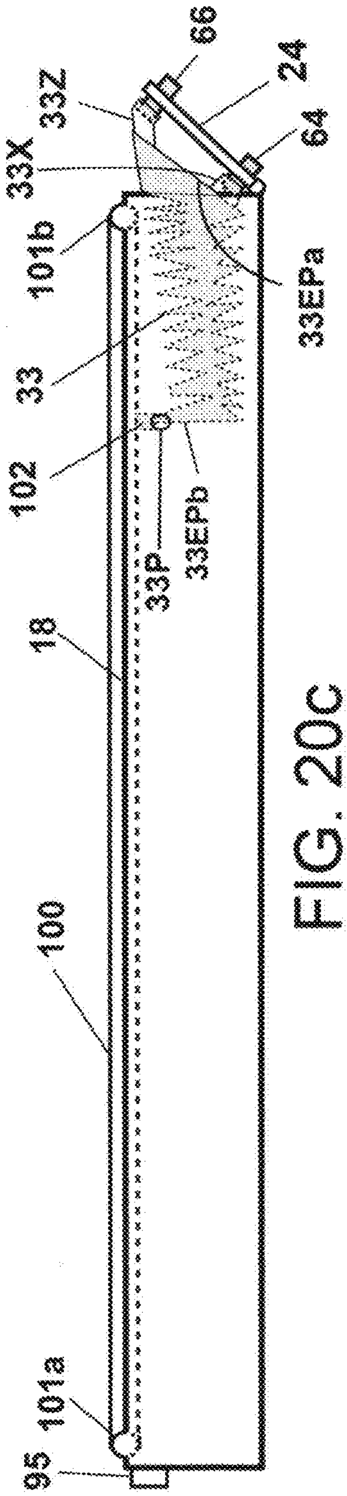
FIG. 20*c* is a sequential side view showing the first step of installing a poly liner inside the container housing with the end plate on the container housing partially opened with the poly liner fill-discharge tube on the poly liner connected to the end plate fill-discharge tube as well as the poly liner breather tube connected to the end plate breather tube. Also shown is a poly liner end panel attached to the liner cable cord.
Figure 21:
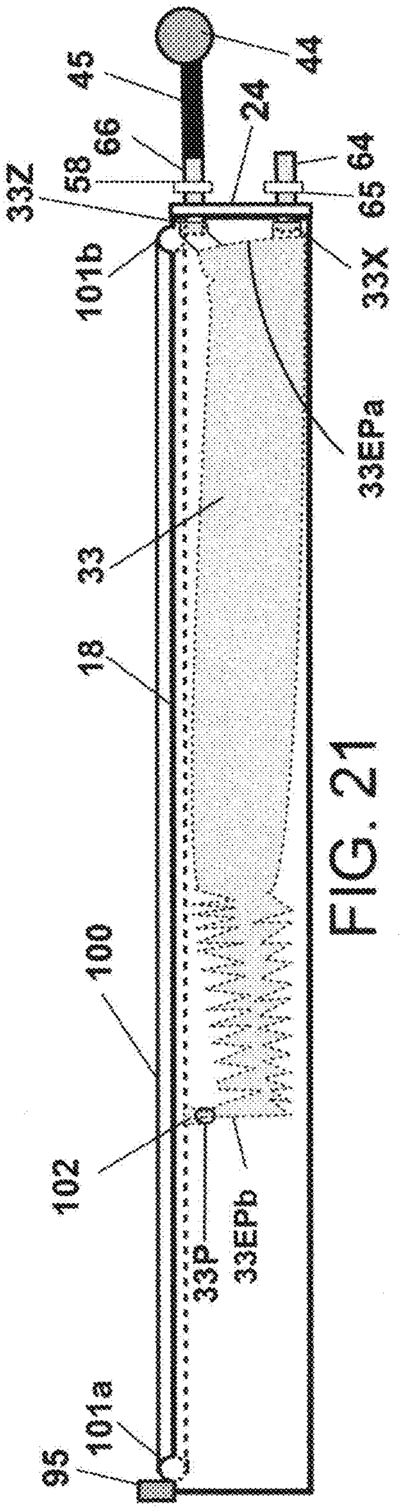
FIG. 21 is a sequential side view of the poly liner being installed inside the container housing via the use of a blower to inflate the poly liner as well as the use of the liner cable cord. Notice that as the poly liner expands while being inflated, the air inside the container housing may be exhausted through a breather vent located at the top front end of the container housing.
Figure 22:
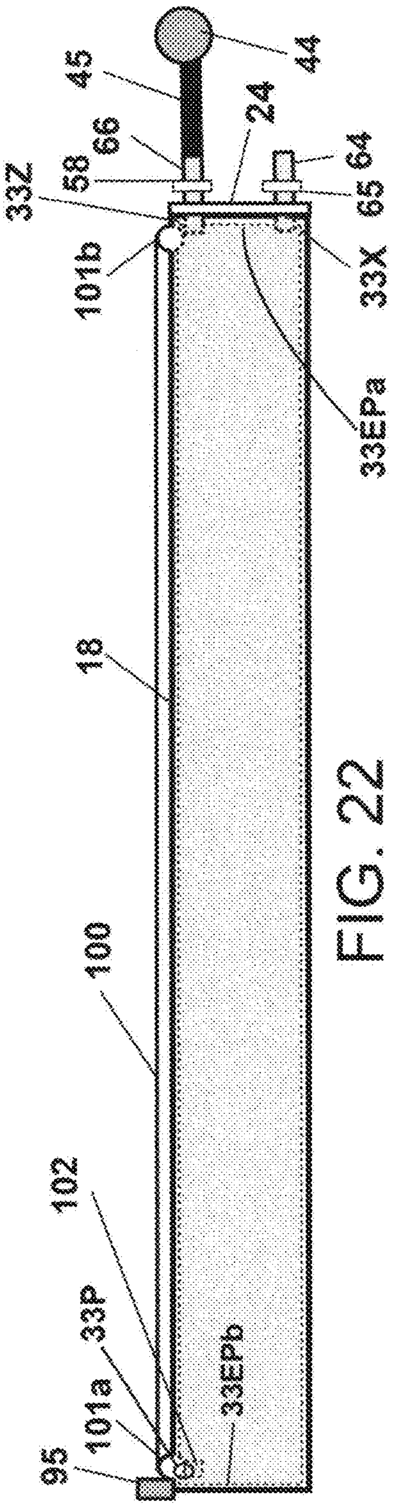
FIG. 22 is a sequential side view showing the poly liner installed inside the container housing.

FIGS. 20*c*, 21, and 22 are sequential side views showing how poly liner 33 is inserted, inflated, sealed closed, and made ready to handle a load of liquid bulk material. In FIG. 20*c*, poly liner 33 has been removed from its sanitary and closed storage package and is partially unfolded and expanded as air enters the open liner breather tube 33Z as well as its liner fill-discharge tube 33X. The first task for the operator is to attach liner pull tab 33T of poly liner 33 located on end panel 33EP and then attach the cable cord clip to liner cable cord 100. At this point, the liner cable cord 100 can be manually pulled into the container housing 18. Next, liner fill-discharge tube 33X of poly liner 33 is connected and tightly sealed around breather tube 33Z tube 64. Next, the operator connects liner fill-discharge tube 33X of poly liner 33 to end plate fill-discharge tube 64. In FIG. 21, because poly liner 33 has been kept and packaged with a near vacuum condition inside poly liner 33, liner inflate blower 44 is turned on, which blows high volume, low-pressure air (200 CFM at ¼ PSI) through inflate blower hose 45 and into poly liner 33 to help it expand. An air filter may be used with liner inflate blower 44. As air from liner inflate blower fills poly liner 33, the operator can continually pull on liner cable cord 100 to move end panel 33EP towards the front end of container housing 18. While this process continues, air that is trapped inside container housing 18 may escape through breather vent 95. During the poly liner 33 insertion process, the operator understands that they need to handle the airflow transfer not only inside poly liner 33, but also inside container housing 18. In FIG. 22, liner cable cord 100 is suspended between cable cord pulley assemblies 101*a* and 101*b*, which are mounted on the outside of the container housing 18. Use of cable cord 100 ends when end panel of poly liner 33EP comes to rest at the end panel of container housing 18. In practice, poly liner 33 should be placed under pressure (5 to 10 inches of water pressure) to ensure the poly liner 33 is fitted tightly against the entire interior surface of container housing 18 so that poly liner 33 is never stressed, torn or ripped which could cause leaking. The use of liner pressure relief valve 58 and discharge valve 65 can be adjusted to ensure poly liner 33 may be fully inflated and kept under pressure while the filling and emptying process of liquids is performed. Assuming end plate fill-discharge tube 64 is used for filling liquid into poly liner 33, as liquid enters poly liner 33, the air within poly liner 33 will need to escape via liner pressure relief valve 58. Liner pressure relief valve 58 may be adjusted and automatically controlled to make sure some pressure remains inside poly liner 33. It may also be useful to attach the vacuum end of inflate blower 44 to breather tube 95 for a smoother insertion process.

Figure 24:
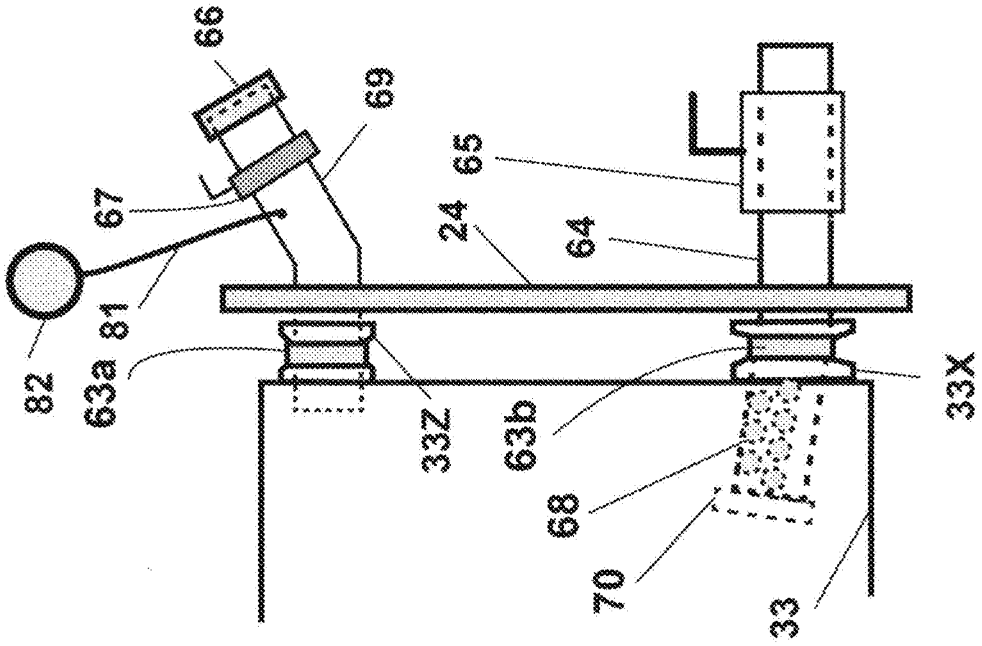
FIG. 24 is a side view of the poly liner connected to the fill-discharge tube and breather tube via placing clamps around the poly liner tubes of the poly liner.
Figure 23:
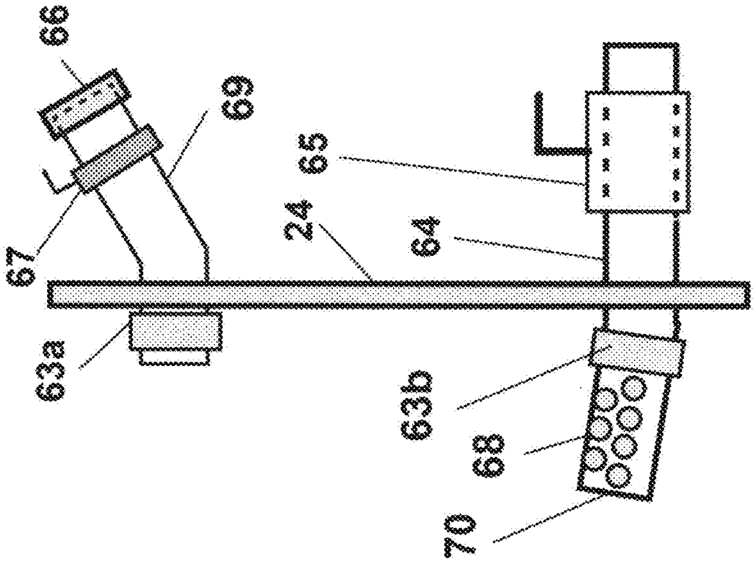
FIG. 23 is a side view of the end plate, showing the fill-discharge spouts, clamps, valves, and other components, as well as the breather tube, valve, and associated components.

FIGS. 23 and 24 are side views of end plate 24 shown equipped with end plate fill-discharge tube 64 and breather outlet tube 69. In FIG. 23, end plate fill-discharge tube 64 extends through end plate 24. On the exterior wall of end plate 24, end plate fill-discharge tube 64 is equipped with discharge valve 65, which governs the flow of liquid in and out of container housing 18, and poly liner 33. The end plate fill-discharge tube 64 on the interior wall of end plate 24 may be equipped with baffle plate 70 and baffle holes 68 to help diffuse the stream of liquid entering into poly liner 33. It is important that a strong stream of liquid, under pressure does not interact, move and/or damage poly liner 33 as it enters the bulk liquid system 22. Also shown is liner clamp 63*b*, which can be used to secure liner fill-discharge tube liner spout 33X to end plate fill-discharge tube 64. Also shown near the top of end plate 24 is breather inlet-outlet tube 69 to help control the flow of air in and out of poly liner 33 while it is used inside container housing 18. As shown, breather inlet-outlet tube 69 is equipped with breather valve 67 as well as end plate breather coupling 66 on the exterior side of end plate 24. On the interior wall of end plate 24, liner clamp 63*b* is located for attaching liner spout 33Z. In FIG. 24, poly liner 33, which may be made of a range of poly film thicknesses from 4 Mil to 20 Mil or higher, is connected to and is fastened tightly to breather inlet-outlet tube 69 via liner breather tube 33Z and liner clamp 63*a* while and end plate fill-discharge tube 64 is secured tightly to liner fill-discharge tube 33X and liner clamp 63*b*. For a typical application, liner breather tube 33Z and liner fill-discharge tube 33X may be made of a thicker poly film than that of poly liner 33. For example, if poly liner 33 is made of 4 Mil poly film, liner breather tube 33Z, and liner fill-discharge tube 33X may be made of a heavier and more durable 6 or 8 Mil poly film. Poly liner 33 may be made of low-density polyethylene film with various chemical formulas and physical characteristics that may be adjusted for each application.

To monitor the air pressure inside poly liner 33 during the filling and unloading procedures, pressure hose 81 is connected between breather inlet-outlet tube 69 and pressure gauge 82. In addition to being strong, pliable, clear, tear-resistant, and relatively inexpensive, one of polyethylene film's best properties is its ease of recycling.

Figure 25:
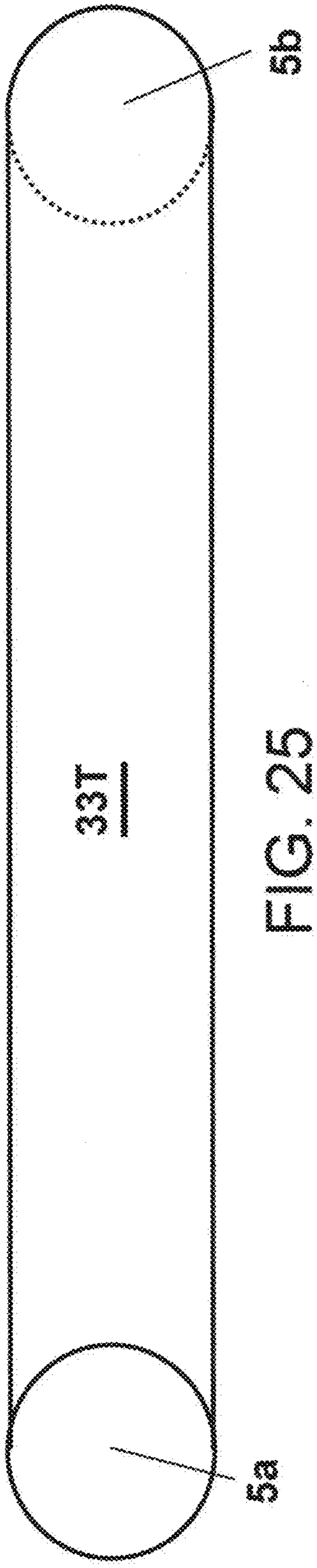
FIG. 25 is a side view of a length of oof a poly film sleeve with the ends open.

FIG. 25 is a side view of a length of poly liner sleeve 33T with open ends 5*a* and 5*b*. Poly liner sleeve 33T may also be referred to as poly lay flat tubular film of blown film extrusion which can be purchased in roll form and simply cut to length.

Figure 25B:
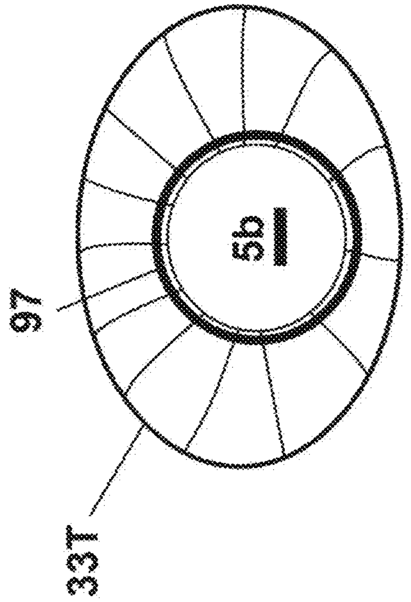
FIG. 25*b* is an end view of a poly film sleeve gathered into a smaller diameter opening and inserted through an access port frame.
Figure 25A:
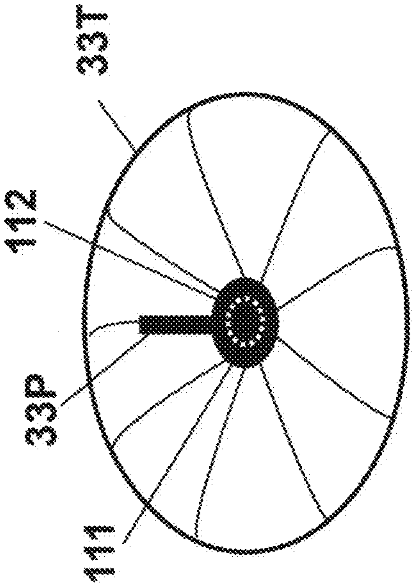
FIG. 25*a* is an end view of an end of a poly film sleeve closed tightly via a poly liner knot and pull tab held together in a leak proof manner via a poly liner closure band.

FIG. 25*a* is an end view of open end 5*a* of poly film sleeve 33T gathered and tied off into poly liner knot 111 with and secured via poly liner closure band 112. Also shown is liner pull tab 33P secured to poly liner knot 111 and poly liner closure band 112.

Figure 25C:
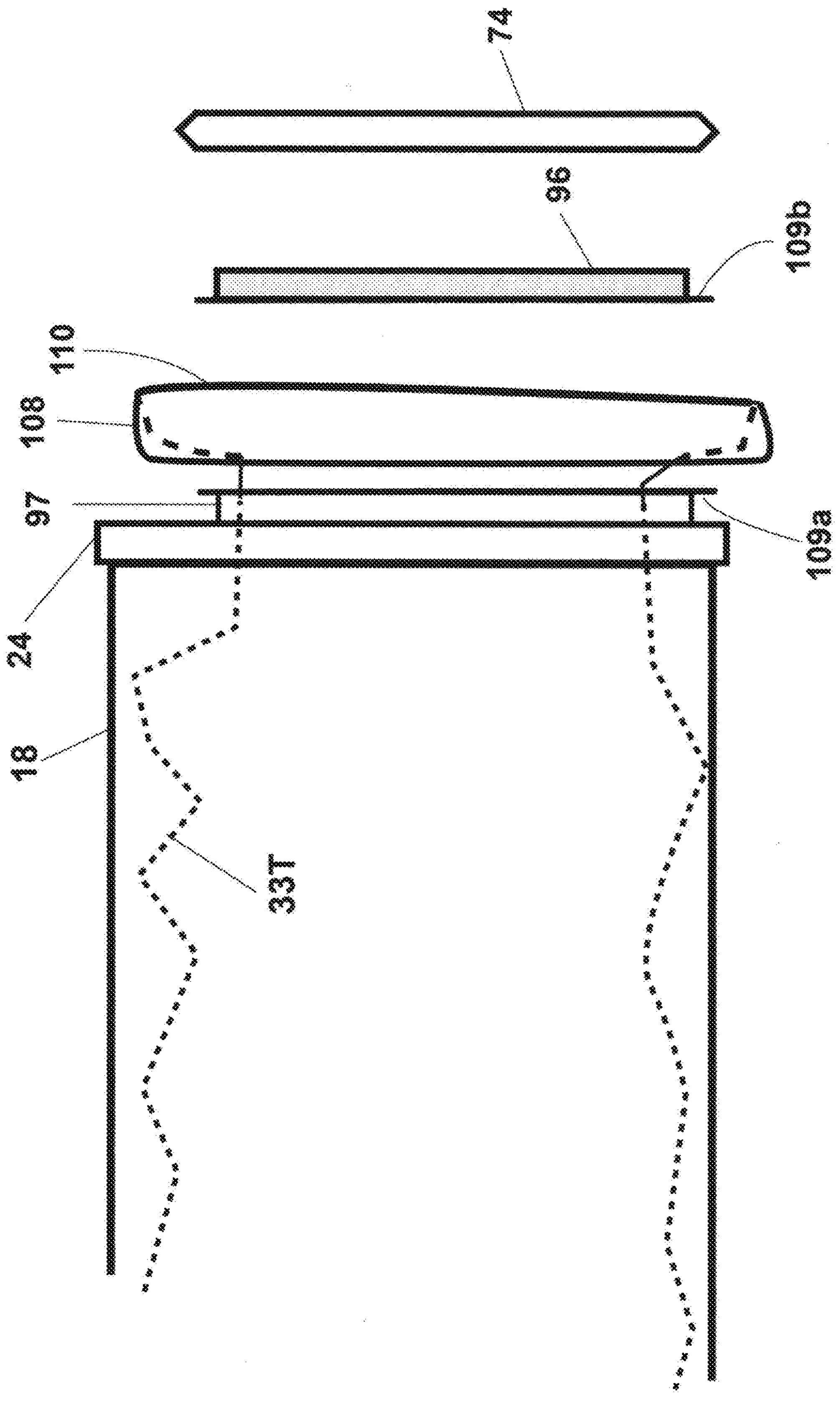
FIG. 25*c* is a side view of a low-cost and simple poly film sleeve, without end panels or tube spouts, placed through the access port on the end plate.
Figure 26:
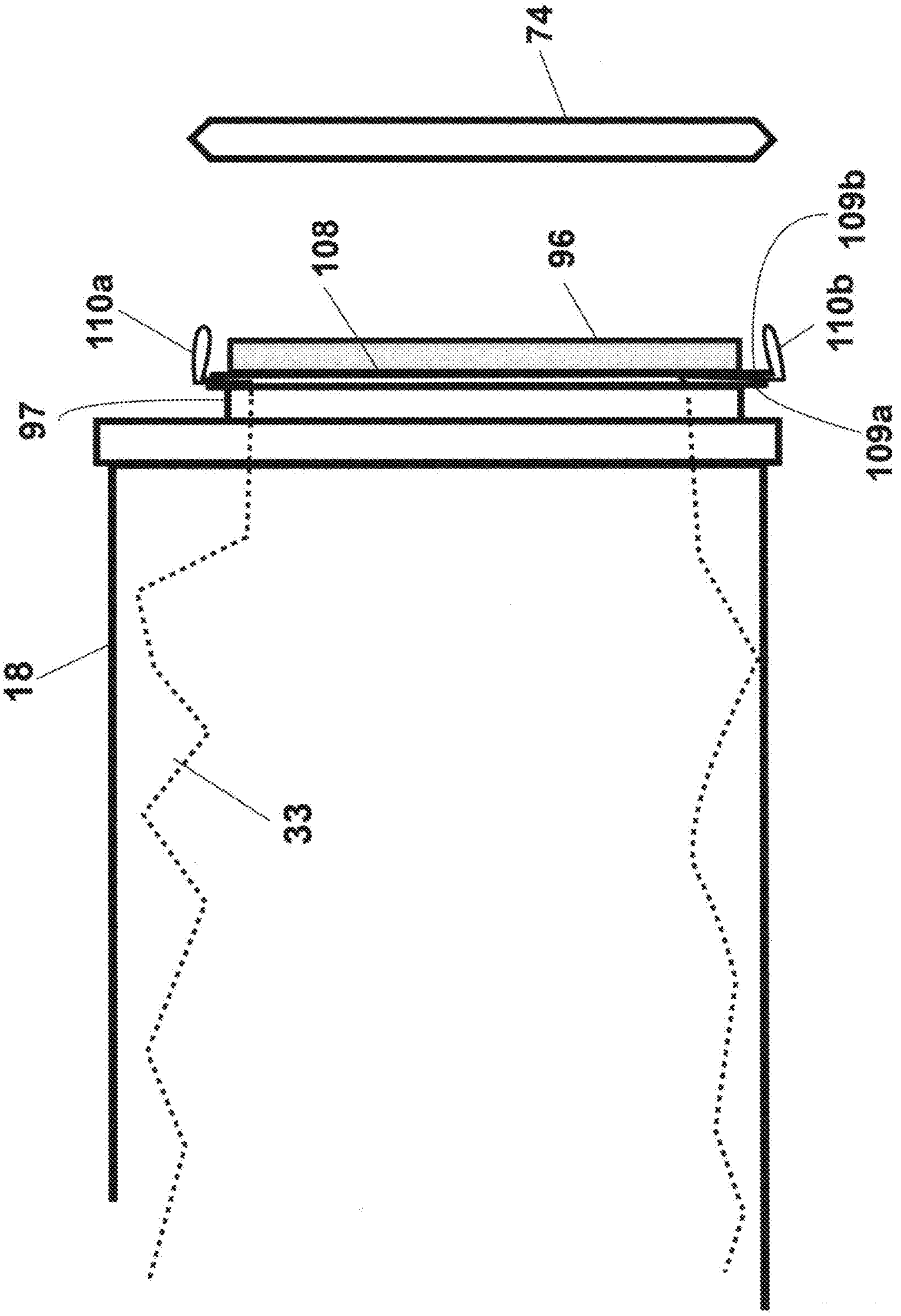
FIG. 26 is a side view of a poly film sleeve partially opened up inside the container housing, with its end pulled through the access port opening and sandwiched between two matching flanges.
Figure 27:
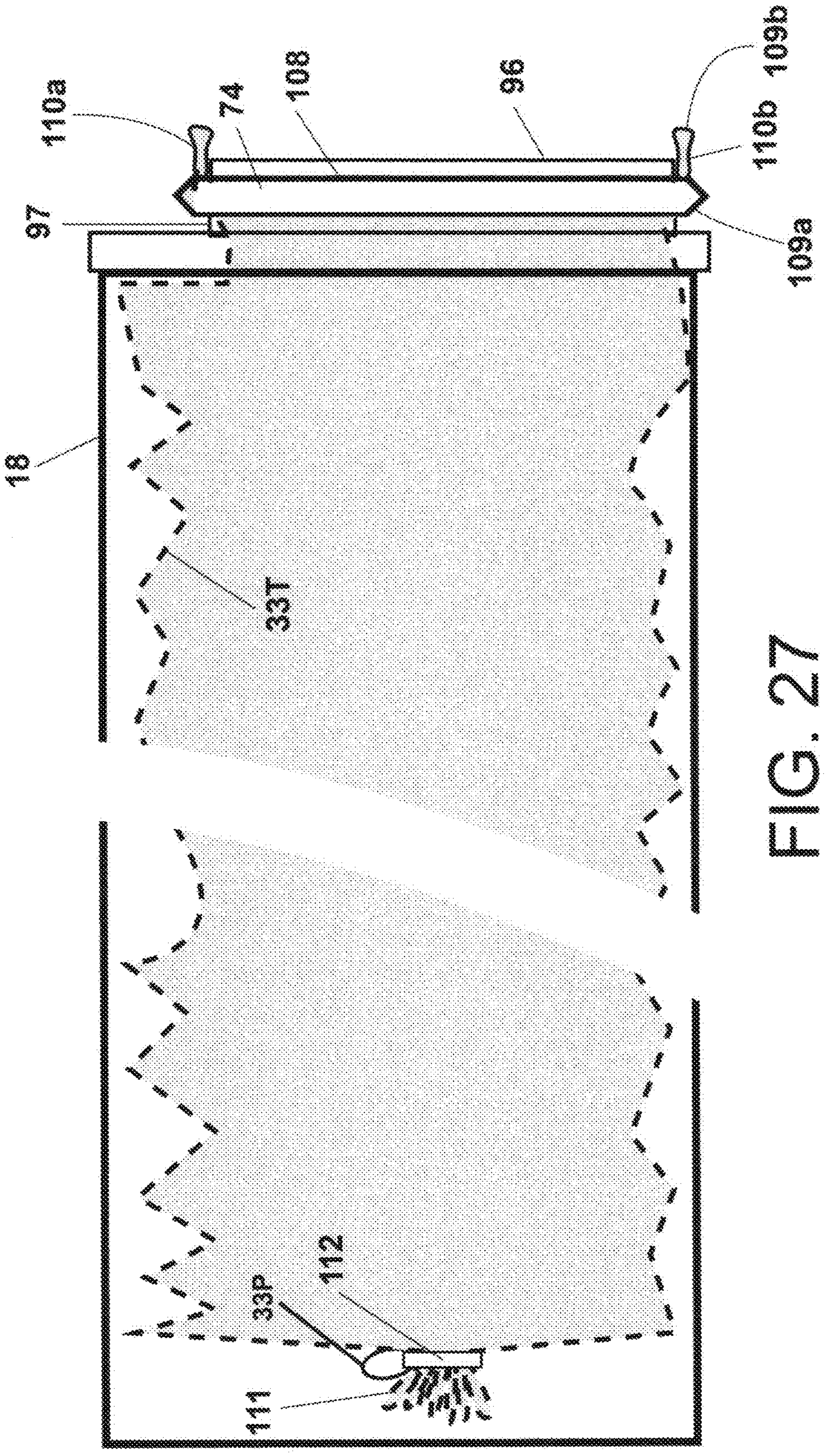
FIG. 27 is a partial side view of a poly film sleeve with the left end tied in a leak-proof knot with the pull loop tightened with a clamp. The right end is fastened around and through the access cover via a V-band clamp, creating a leak-proof seal.
Figure 28:
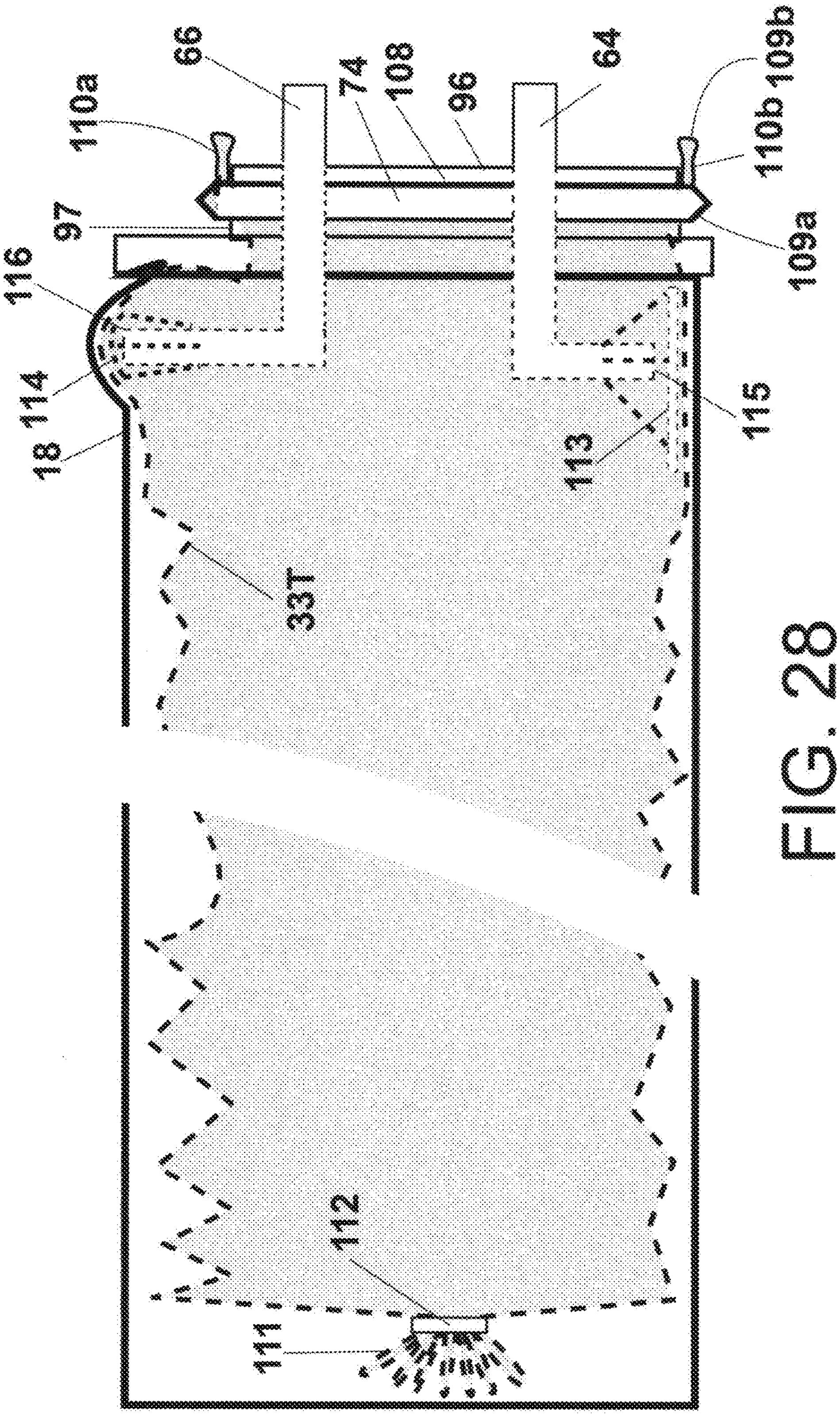
FIG. 28 is a partial side view of the poly liner installed inside the container housing, equipped with an access cover featuring a breather tube assembly and a fill-discharge tube assembly.

FIG. 25*b* is an end view is an end view of poly film sleeve 33T gathered to make open end 5*b* smaller so it can be pulled through access port frame 97. Please note that if the length container housing 18 is 40', poly film sleeve 33T may need to be longer, such as 46', because the ends of poly film sleeve 33T will be used to form end panels. container housing 18 through access port frame 97, which is fixed to end plate 24. As shown in FIG. 25*c*, the fill-discharge end of poly film sleeve 33T pulled through access port frame 97 and folded over on itself to form a multi-ply, thicker, and stronger clamping area. To ensure the closure is leak-proof, the connection of the poly film sleeve 33T may be equipped with gasket material. The access port cover 96 and V-Band clamp 74 are also shown. Multiple poly film sleeves (33T) may be used inside of one another for greater strength and durability. Poly film sleeve 33T, like the poly liner 33, can be made via a "blown film extruding" process. In FIG. 26, poly liner collar(s) 110*a* and 110*b* is pulled through and sandwiched between flange lip 109*a* fixed to access port frame 97 and flange lip 109*b* of access cover 96. The entire circumference of poly liner collar 110 will be paced between the entire circumference around the flat and mating surface of flange lips 109*a* and 109*b*. As V-Band clamp 74 is wrapped and tightened around poly liner collar 110 sandwiched between flange lips 109*a* and 109*b*, a water-tight seal may be achieved. It may be necessary for some applications to use a gasket made of rubber or other pliable material on one side or the other or both against flange lips 109*a* and 109*b* to ensure a water-tight and sealed closure. In FIG. 27, both ends of poly film sleeve/tubing 33T are sealed closed with left/front end closed with poly liner knot 111 secured with poly liner closure band 112. Also shown is liner pull tab 33P secured to poly liner closure band 112 for pulling poly film tube 33T in and out of container housing 18. Right, rear end of poly film sleeve 33T is pulled through access port frame 97 and sandwiched between access port cover 96 with V-Band Clamp 74 installed and tightened to form a leak-proof connection. In FIG. 28, poly film sleeve 33T is secured and installed inside container housing 18 and around access cover 96. In this configuration, end plate fill-discharge tube 64 and end plate breather tube 66 extend through access port cover 96. To ensure that a strong stream of liquid 99 whether entering or existing poly film tube 33T or poly liner 33, the fill-discharge outlet 115 and breather tube outlet 116 are equipped with fill plate assembly 113 and breather plate assembly 114 to hold poly liners tightly against container housing 18 preventing possible damage. Because access port cover 96, end plate breather tube 66, and end plate fill-discharge tube 64 will come in direct contact with liquids being transported will need to be thoroughly washed and cleaned after each load. These components, as well as others, may be made of stainless steel using sanitary welds.

Figure 29:
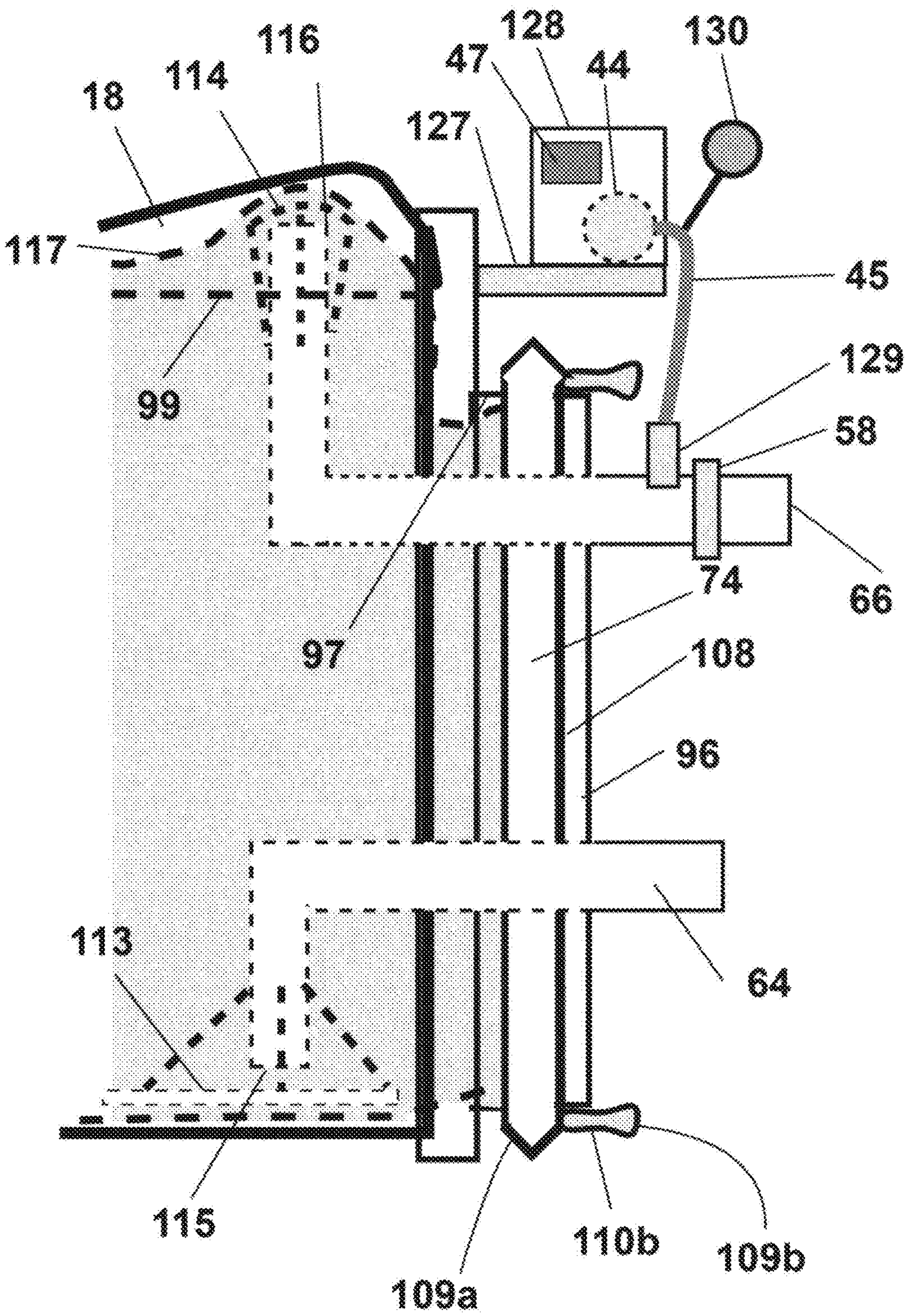
FIG. 29 is a partial side view showing the breather tube and fill-discharge tube assemblies fitted to the access port cover with the control enclosure switches, blower, hose, valves, and gauges controlling the pressurization of the poly film sleeve within the container housing.

FIG. 29 is a partial side view of container housing 18 with poly sleeve liner 33T installed inside in a leakproof manner via V band clamp 74. To monitor and provide an automatic control system for regulating the air pressure inside poly sleeve liner 33T, control enclosure 128 is mounted to end plate 24 via control enclosure bracket 127. As shown, pressure gauge control and hose assembly 130 monitors air pressure inside poly sleeve liner 33T which can cause liner inflate blower 44 to turn, open flow valve 129 and add pressurized air inside poly sleeve liner 33T. For this action, liner pressure relief valve 58 should remain closed. Once the desired pressure is achieved inside poly sleeve liner 33T, valve 129 may automatically close. A typical pressure inside poly tube liner 33T should be about 5 inches of water pressure. If pressure inside poly sleeve liner 33T too high, pressure gauge control and hose assembly will signal PLC 47 to open and vent the pressurized air until it is stabilized at its set point. PLC 47 can also be integrated with a liquid sensor, temperature sensor, and other switches and gauge devices so it can send warnings, alarms, updates, and current status/condition to the operator via a phone app. Note that the breather tube outlet 116 may be positioned higher than the level of liquid 99 inside the poly sleeve liner 33T.

TABLE OF REFERENCES

5 Open End
6 Heat Seal
7 Trailer Wall
8 Lift Frame Assembly
9 Tractor
10 Van Trailer
11 Van Roof
12 Van Floor
13 Base Frame Assembly
13*a* Cross Support
14 Top Rail
15 Container Housing Frame
15V Vertical Frame Post
15H Horizontal Frame Beam
16 Top Rail Bracket
16X Top Rail Axle Bolt
17 Base Rail
17B Base Rail Bracket
17X Bottom Rail Axle Bolt
17H Locking Hub
18 Container Housing
18S Poly Liner Slack
19 Container Housing Closure Flap
19L Container Housing Loop Support
20 Lift Cable
21 Position Cable
22 Liquid Bulk System
23 Roof Support Frame
24 End Plate (clear-see through)
24X End Plate Frame
25 End Plate Brace
26 Container Housing Opening
27 Connector Rail
28 Walkway
29 Van Bulkhead
30 Post Assembly
31 End Rail Frame
32 Discharge Opening
33 Poly Liner

33C Liquid Compartment
33S Poly Liner Slack
33EP Poly Liner End Panel
33X Liner Fill-Discharge Tube
33Z Liner Breather Tube
33S Liner Slack
33P Liner Pull Tab
33T Poly Film Sleeve
34 Cable Anchor
35 Pulley
36 Spring
37 Top Rail Lock
38 Hoist Assembly
39 Inflate Liner
39S Inflate Liner Seal
39M Inflate Membrane
40 Liquid Sensor
41 Inflate Membrane Hose
42 Inflate Membrane Compressor
43 Temperature Sensor
44 Liner Inflate Blower
45 Inflate Blower Hose
46 Discharge Spout
47 Programmable Logic Controller
48 Hydraulic Pump
49X Hydraulic Output Hose
49Z Hydraulic Return Hose
50 Hydraulic Cylinder
51 Hydraulic Cylinder Frame
52 Cable Pulley
53 Cylinder Rod
54 Fixed Double Pulley Assembly
55 Movable Double Sheave Assembly
56 Poly Liner Compression Cylinder System
57 Phone APP
58 Liner Pressure Relief Valve
59 Heat-Cooling Tube
60 Trailer Bulkhead
61 Lift Lock
62 Lift Bracket
63 Liner Clamp
64 End Plate Fill-Discharge Tube
65 Discharge Valve
66 End Plate Breather Tube
67 Pressure Relief Valve
68 Baffle Holes
69 Breather Inlet-Outlet Tube
69X Breather Outlet Coupling
70 Baffle Plate
71 Container Housing Hub
72 Container Housing Hub Clamp
73 Hub Bolt
73 End Plate Hub Holes
74 V Band Clamp
75 Hub Flange
76 End Plate Flange
77 Lift Pulley
78 Pulley Frame
79 Lift Frame
80 Pendant Switch
81 Pressure Hose
82 Pressure Gauge
83 Trailer Floor Hole
84 Floor Locking Pin
85 Ring Flap
86 Ring Gap
87 Load Lock Support
88 End Support
89 Top Rail Support Flange
90 Immersion Heater
91 Lock Pin
92 Pull Line
93 Palletized Cargo
94 Trailer Door
95 Breather Vent
96 Access Port Cover
97 Access Port Frame
98 Flow Propeller
99 Liquid
100 Liner Cable Cord
101 Cable Cord Pulley Assembly
102 Cable Cord Clip
103 Straight Pipe Fitting
104 90 Degree Elbow Pipe Fitting
105 Swivel Pipe Fitting
106 Double Liner
107 Envelope Liner
108 Poly Liner Open End
109 Flange Lip
110 Poly Liner Collar
111 Poly Liner Knot
112 Poly Liner Closure Band
113 Fill Plate Assembly
114 Breather Plate Assembly
115 Fill-Discharge Tube Outlet
116 Breather Tube Outlet
117 Poly Tube Liner
118 Ringer
119 Conveyor
120 Ramp
121 Liquid Silo
122 Silo Valve
123 Silo Hose
124 Hose Coupling
125 Zipper
126 Discharge Hose
127 Control Enclosure Bracket
128 Control Enclosure
129 Flow Valve
130 Pressure Gauge Control and Hose
131 Top Opening

I claim:

1. A freight vehicle cargo handling apparatus comprising a liquid bulk handling system (22) attachable to a roof (11) of a freight vehicle, the liquid bulk handling system comprising:

a lift frame assembly (8) attachable under the roof (11); the lift frame assembly comprising:

lift cables (20) attached to the roof (11) for lowering the lift frame assembly (8) from the roof;

a container frame (15) attached to the lift cables (20) at a bottom of the container frame;

a flexible container housing (18) attached within the container frame (15); and a poly liner (33) or poly film sleeve (33T) disposed within the flexible container housing (18) for containing liquid bulk goods.

2. The freight vehicle cargo handling apparatus of claim 1, the liquid bulk handling system (22) further comprising a top rail (14); and the freight vehicle cargo handling apparatus further comprising position cables (21) that extend from the lift frame assembly (8) to the top rail (14), the position cables having lengths selected so that the position cables are slack when the freight vehicle cargo handling apparatus is in a stored configuration and taut when the freight vehicle cargo handling apparatus is in a deployed configuration.

3. The freight vehicle cargo handling apparatus of claim 2, further comprising a top rail lock (37) configured to hold the top rail (14) in position against a freight vehicle bulkhead (60) and a freight vehicle end plate brace (25).

4. The freight vehicle cargo handling apparatus of claim 3, wherein an operator has complete access inside the freight vehicle from the bulkhead (60) to a rear opening (94) via a walkway (28).

5. The freight vehicle cargo handling apparatus of claim 1, further comprising:
- an end plate frame (24X) affixed to a back end of the container housing (18); and
- an end plate (24).

6. The freight vehicle cargo handling apparatus of claim 1, the container housing (18) comprising a breather vent (95) for allowing air to escape from inside the container housing during a filling process.

7. The freight vehicle cargo handling apparatus of claim 6, further comprising an end plate (24), the end plate comprising a clear plastic access port cover (96) for visually inspecting a loading and unloading process.

8. The freight vehicle cargo handling apparatus of claim 1, further comprising:
- hydraulic cylinders (50); and
- a hydraulic pump (48),
- wherein the hydraulic cylinders and hydraulic pump are sized to lift a weight of the liquid bulk handing system (22) plus up to 200 pounds of liquid to prevent injury to an operator and/or damage to the lift frame assembly (8).

9. The freight vehicle cargo handling apparatus of claim 8, further comprising:
- double sheave pulley assemblies (54, 55) sized to deliver up to eight feet of lift via the lift cables from two feet of extension of the hydraulic cylinders.

10. The freight vehicle cargo handling apparatus of claim 8, wherein the hydraulic pump (48) is operable under 115V or 12V electrical current.

11. The freight vehicle cargo handling apparatus of claim 1, further comprising:
- a base frame assembly (13) comprising one or more floor locking pins (84) configured to fit inside one or more respective trailer floor holes (83),
- wherein the container housing (18) is secured to the base frame assembly (13).

12. The freight vehicle cargo handling apparatus of claim 1, the poly liner (33) comprising a poly liner slack section (18S) sized to expand the poly liner in every dimension and to make the poly liner larger in every dimension than the container housing when the poly liner is filled.

13. The freight vehicle cargo handling apparatus of claim 1, the container housing frame (15) comprising:
- straight container housing frame sections;
- angled container housing frame sections:
- straight pipe fittings (103) configured to join the straight container housing frame sections together;
- 90-degree pipe fittings (104) configured to join the straight container housing frame sections and the angled container housing frame sections together; and
- swivel pipe fittings (105) configured to join the angled container housing frame sections to a base rail (17), thereby making the container housing frame modular and capable of quick and easy repair and replacement of components of the container housing frame (15).

14. The freight vehicle cargo handling apparatus of claim 1, wherein the flexible container housing (18) is an elongated tube shape or oval shape, thereby keeping a center of gravity of a load contained by the container housing as low as possible and creating a larger base area supportable by a floor of the freight vehicle.

15. The freight vehicle cargo handling apparatus of claim 1,
- the container housing frame (15) comprising:
  - a top section (15H) of the container housing frame;
  - top rail brackets (16*a*, 16*b*) attached to the top section (15H);
  - top rails (14*a*, 14*b*) attached to respective ones of the top rail brackets (16*a*, 16*b*); and
  - a top rail axle bolt (16X) adjustably connected to both the top rail brackets (16*a*, 16*b*) and top rails (14*a*, 14*b*) and thereby adding support to hold the top rail brackets in a stable and locked position;
- the container housing (18) further comprising container housing support loops (19L) securable to the top rails (14*a*, 14*b*) such that the top rails can be moved inward or outward on the top section (15H) to change a shape and profile of the container housing (18).

16. The freight vehicle cargo handling apparatus of claim 1, the container housing (18) comprising inflate liners (39*a*, 39*b*) disposed within the container housing and configured to drain and collect a liquid (99) within the container housing.

17. The freight vehicle cargo handling apparatus of claim 1, further comprising:
- a breather vent (95) connected to a distal end of the container housing (18);
- an inflate blower hose (45) connected to a proximal end of the poly liner (33); and
- an inflate blower (44) connected to the inflate blower hose (45), for blowing air at 200 CFM and ¼ PSI into the poly liner (33) and allowing trapped air inside the container housing to escape through the breather vent.

18. The freight vehicle cargo handling apparatus of claim 17, further comprising:
- an automatically adjustable liner pressure relief valve (58) disposed between the blower hose (45) and the poly liner (33); and
- a discharge valve (65) connected to the poly liner (33) at a location lower than the liner pressure relieve valve (58) for placing the poly liner under pressure of between 5 and 10 inches of water during filling and emptying of liquids to ensure the poly liner is fitted tightly against an entire interior surface of the container housing (18) such that the poly liner is never stressed, torn, or ripped, which could cause leaking.

19. The freight vehicle cargo handling apparatus of claim 1, further comprising:
- an end plate (24); and
- an end plate fill-discharge tube (64) disposed through the end plate, the fill-discharge tube comprising:
  - a baffle plate (70); and
  - baffle holes (68) on an interior-facing end of the fill-discharge tube (64), the baffle plate and baffle holes helping to diffuse a stream of liquid entering into the poly liner (33).

20. The freight vehicle cargo handling apparatus of claim 19, further comprising:

a breather inlet-outlet tube (69) disposed near a top end of the end plate (24) to help control a flow of air in and out of the poly liner (33);

a breather valve (67) disposed on the breather inlet-outlet tube (69); and a breather coupling (66) disposed on an end of the breather inlet-outlet tube (69).

21. The freight vehicle cargo handling apparatus of claim 1, wherein the poly liner (33) and/or poly film sleeve (33T) has a thickness of between 4 mil and 20 mil.

22. The freight vehicle cargo handling apparatus of claim 1, wherein the poly liner (33) or poly film sleeve (33T) is the poly film sleeve (33T);

the freight vehicle cargo handling apparatus further comprising:

gasket material; and an access port frame (97), whereby using the gasket material ensures that a closure between the access port frame (97) and the poly film sleeve (33T) is leak-proof.

23. The freight vehicle cargo handling apparatus of claim 1, wherein the poly liner (33) or poly film sleeve (33T) is the poly film sleeve (33T);

the freight vehicle cargo handling apparatus further comprising:

an end plate (24);

a breather inlet-outlet tube disposed near a top end of the end plate (24) to help control a flow of air in and out of the poly film sleeve (33T);

a liner pressure relief valve (58) disposed on the breather inlet-outlet tube; and an automatic control system for regulating air pressure inside the poly sleeve liner, the automatic control system comprising:

a control enclosure bracket (127);

a control enclosure (128) mounted on the end plate (24) via the control enclosure bracket (127);

an inflate blower (44);

a flow valve (129) connected to the breather inlet-outlet tube; and a pressure gauge control and hose assembly (130) connected to the inflate blower (44) and the flow valve (129) for monitoring air pressure inside the poly sleeve liner (33T) and which can cause the inflate blower (44) to operate, open the flow valve (129), and thereby add pressured air inside the poly sleeve liner (33T).

24. The freight vehicle cargo handling apparatus of claim 23, the automatic control system further comprising:

a PLC (47);

a liquid level sensor;

a temperature sensor; and an alarm; and a cell phone app, wherein, to maintain a pressure inside the poly film sleeve (33T) at a set point of approximately 5 inches of water, the pressure gauge control and hose assembly (130) is configured to signal the PLC (47) to open and vent pressurized air until the set pressure is stabilized.

* * * * *